(12) United States Patent
Fujimoto et al.

(10) Patent No.: US 10,032,567 B2
(45) Date of Patent: Jul. 24, 2018

(54) SOLID-STATE ELECTROLYTIC CAPACITOR MANUFACTURING METHOD AND SOLID-STATE ELECTROLYTIC CAPACITOR

(71) Applicant: Murata Manufacturing Co., Ltd., Nagaokakyo-shi, Kyoto-fu (JP)

(72) Inventors: Koji Fujimoto, Nagaokakyo (JP); Emi Matsushita, Nagaokakyo (JP); Hitoshi Kuromi, Nagaokakyo (JP); Taro Ueno, Nagaokakyo (JP); Yoshihiro Koshido, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 15/375,602

(22) Filed: Dec. 12, 2016

(65) Prior Publication Data
US 2017/0092432 A1    Mar. 30, 2017

Related U.S. Application Data

(60) Division of application No. 14/049,320, filed on Oct. 9, 2013, now Pat. No. 9,552,928, which is a
(Continued)

(30) Foreign Application Priority Data

Apr. 20, 2011    (JP) ................. 2011-093663

(51) Int. Cl.
*H01G 9/15* (2006.01)
*H01G 9/025* (2006.01)
*H01G 9/042* (2006.01)

(52) U.S. Cl.
CPC ............ *H01G 9/15* (2013.01); *H01G 9/025* (2013.01); *H01G 9/0425* (2013.01)

(58) Field of Classification Search
CPC .................... H01G 9/042; H01G 9/045
(Continued)

(56) References Cited

U.S. PATENT DOCUMENTS 4,090,231 A * 5/1978 Millard ............... H01G 9/0029
                                                                361/529
6,320,742 B1    11/2001 Wada et al.
(Continued)

FOREIGN PATENT DOCUMENTS

JP    55-067127    5/1980
JP    S62-136015 A    6/1987
(Continued)

OTHER PUBLICATIONS

International Search Report for PCT/JP2012/059054, dated May 29, 2012.
(Continued)

*Primary Examiner* — Eric Thomas
(74) *Attorney, Agent, or Firm* — Arent Fox LLP

(57) ABSTRACT

A solid electrolytic capacitor having grooves provided in a valve-acting metal substrate that includes a porous surface part and a non-porous body part, the bottoms of the grooves being non-porous. The valve-acting metal substrate is divided into a plurality of unit regions by the grooves, and define cathode layer formation parts in the porous surface parts for each unit region. A dielectric layer covers the surfaces of the cathode layer formation parts of the valve-acting metal substrate and the grooves between the cathode layer formation parts. A solid electrolyte layer and a cathode extraction layer cover the surface of the dielectric layer, thereby providing a sheet in which a plurality of solid electrolytic capacitor elements are prepared integrally with the grooves interposed therebetween. The sheet is cut at the
(Continued)

grooves, and a dielectric layer is formed on the cut surfaces located around the cathode layer formation parts.

4 Claims, 22 Drawing Sheets

Related U.S. Application Data continuation of application No. PCT/JP2012/059054, filed on Apr. 3, 2012.

(58) Field of Classification Search
USPC .......................................................... 361/541
See application file for complete search history.

(56) References Cited

U.S. PATENT DOCUMENTS 6,775,126 B2 * 8/2004 Fujii ..................... H01G 9/042
29/25.03

8,419,809 B2 4/2013 Ishimaru
8,702,817 B2 4/2014 Ishimaru

FOREIGN PATENT DOCUMENTS

| JP | 64-073711 | 3/1989 |
|----|-----------|--------|
| JP | H01-127231 U | 8/1989 |
| JP | H03-023614 A | 1/1991 |
| JP | 2000-243665 A | 9/2000 |
| JP | 2007-318056 A | 12/2007 |
| JP | 2010-219128 A | 9/2010 |

OTHER PUBLICATIONS

Japanese Office Action issued for counterpart application JP 2013-510931, dated Jan. 21, 2014 (with English translation).
PCT/JP2012/059054 ISR dated May 18, 2012.
PCT/JP2012/059054 Written Opinion dated May 18, 2012.

* cited by examiner (a)

(b)

(a)

(b)

(a)

(b)

(a)

(b)

(c)

(a)

(b)

(a)

(b)

(a)

(b)

(c)

(a)

(b)  (c)

(a)

(b)

(c)

SOLID-STATE ELECTROLYTIC CAPACITOR MANUFACTURING METHOD AND SOLID-STATE ELECTROLYTIC CAPACITOR

CROSS REFERENCE TO RELATED APPLICATIONS

The present application is a divisional of application Ser. No. 14/049,320, filed Oct. 9, 2013, which is a continuation of International application No. PCT/JP2012/059054, filed Apr. 3, 2012, which claims priority to Japanese Patent Application No. 2011-093663, filed Apr. 20, 2011, the entire contents of each of which are incorporated herein by reference.

FIELD OF THE INVENTION

The present invention relates to a method for manufacturing a solid electrolytic capacitor. Furthermore, the present invention also relates to a solid electrolytic capacitor element and a solid electrolytic capacitor that can be manufactured by the method for manufacturing a solid electrolytic capacitor.

BACKGROUND OF THE INVENTION

Solid electrolytic capacitors have been required to be reduced in size and increased in capacitance with the reduction in size and thickness for electrical and electronic devices, and furthermore, required to be reduced in leakage current in terms of product safety.

Laminate-type solid electrolytic capacitors have been known as one measure for responding the request for reduction in size and increase in capacitance. Conventionally, a method of obtaining a laminate chip of solid electrolytic capacitor elements by integrally preparing a plurality of solid electrolytic capacitor elements in a sheet form, and stacking and then cutting the thus obtained plurality of sheets is known as a method for manufacturing the solid electrolytic capacitors (see Patent Document 1). More specifically, first, a valve-acting metal substrate (with a surface subjected to no surface roughening) is prepared which includes a plurality of rectangular regions corresponding to solid electrolytic capacitor elements, a resist layer is formed so as to cover the vicinity of at least three sides of these plurality of rectangular regions, the region of the valve-acting metal substrate, which is exposed from the resist layer, is made porous by applying surface roughening to the region, a dielectric layer is formed on the surface of the porous region, and a solid electrolyte layer is then formed as a cathode material layer, thereby providing a sheet that has a plurality of solid electrolytic capacitor elements integrally prepared. A plurality of the sheets are prepared, these sheets are stacked and fixed to form a laminate, and this laminate is cut to follow the rectangular regions corresponding to solid electrolytic capacitor elements, thereby providing a laminate chip of solid electrolytic capacitor elements.

Patent Document 1: JP 2007-318056 A

SUMMARY OF THE INVENTION

In the conventional method for manufacturing a solid electrolytic capacitor as described above, the region of the valve-acting metal substrate, which is exposed from the resist layer, has the valve-acting metal substrate with a surface which has been made porous, the dielectric layer formed on the surface, and the solid electrolytic layer further stacked. In order to cut this laminate of a plurality of the sheets stacked and fixed, there is a need to apply a relatively high load. The high load applied to the dielectric layer makes defects likely to be caused in the dielectric layer, and as a result, there is a possibility of increasing leakage current. There is a possibility that the increased leakage current may lead to short circuit in some cases, and it is preferred to reduce the leakage current as much as possible. In addition, in the conventional method of manufacturing a solid electrolytic capacitor as described above, the valve-acting metal substrate is prepared the surface of which has not been made porous, and after the resist layer is formed in the predetermined region of the valve-acting metal substrate, the region exposed from the resist layer is made porous by applying surface roughening to the region. For this reason, there is a need to prepare, as the valve-acting metal substrate, a substrate with a non-porous surface, and it is not possible to use any commercially available valve-acting metal substrate with a surface which has been already made porous.

An object of the present invention is to provide a novel method for manufacturing a solid electrolytic capacitor, which can reduce the generation of defects in dielectric layer, which could lead to an increase in leakage current, and which has eased restrictions on a valve-acting metal substrate used. A further object of the present invention is to provide a solid electrolytic capacitor element and a solid electrolytic capacitor that can be manufactured by the method for manufacturing a solid electrolytic capacitor.

According to an aspect of the present invention, a method for manufacturing a solid electrolytic capacitor (hereinafter, referred to as a first manufacturing method) is provided, which includes:

(a) a step of providing grooves in both principal surfaces of a valve-acting metal substrate including a porous surface part and a non-porous body part to make the bottoms of the grooves non-porous, partitioning the both principal surfaces of the valve-acting metal substrate into a plurality of unit regions by the grooves, and defining a cathode layer formation part in the porous surface part for each unit region;

(b) a step of forming a dielectric layer on the surfaces of the cathode layer formation parts of the valve-acting metal substrate, and of the grooves between the cathode layer formation parts;

(c) a step of sequentially forming a solid electrolyte layer and a cathode extraction layer on the surface of the dielectric layer formed on the cathode layer formation parts of the valve-acting metal substrate, thereby providing a sheet where a plurality of solid electrolytic capacitor elements corresponding to the plurality of unit regions is formed integrally with the grooves interposed therebetween;

(d) a step of cutting the sheet in the grooves of the valve-acting metal substrate; and (e) a step of forming a dielectric layer on the cut surfaces located around the cathode layer formation parts of the valve-acting metal substrate.

In the conventional method for manufacturing a solid electrolytic capacitor, a sheet that has a plurality of solid electrolytic capacitor elements integrally prepared is cut while having the valve-acting metal substrate with a surface which has been made porous, the dielectric layer formed on the surface, and the solid electrolytic layer further stacked. In contrast, in the first method for manufacturing a solid electrolytic capacitor according to the present invention, the sheet which has a plurality of solid electrolytic capacitor elements integrally prepared is cut in the grooves of the valve-acting metal substrate, and the solid electrolytic layer is not substantially formed in regions corresponding to the cut sections of the grooves. For this reason, the sheet can be cut with a lower load than in conventional manufacturing methods, because the cut sections are reduced in thickness by the corresponding thickness of the solid electrolyte layer. Further, this reduction in the load applied on the dielectric layer for the cutting can reduce the generation of defects in the dielectric layer, thus making it possible to reduce leakage current. Furthermore, the first method for manufacturing a solid electrolytic capacitor according to the present invention uses the valve-acting metal substrate including the porous surface part and the non-porous body part, and partitions the valve-acting metal substrate into a plurality of unit regions by providing the grooves in the both principal surfaces of the valve-acting metal substrate. Thus, commercially available valve-acting metal substrates with surfaces which have been already made porous can be used as such a valve-acting metal substrate, and restrictions on the valve-acting metal substrate used are eased to increase the degree of freedom for the manufacturing method, as compared with conventional manufacturing methods.

According to an aspect of the present invention, in the first method for manufacturing a solid electrolytic capacitor, the steps (a) to (c) may be applied to each of a plurality of valve-acting metal substrates, the thus obtained plurality of sheets may be stacked, and the stacked sheets may be cut in grooves of the valve-acting metal substrates in the step (d).

In the conventional method for manufacturing a solid electrolytic capacitor, a plurality of sheets each with a plurality of solid electrolytic capacitor elements integrally prepared is stacked and fixed, the stacked and fixed sheets are cut without any gaps between the sheets (when attention is focused on each sheet, in the state having a valve-acting metal substrate with a porous surface, a dielectric layer formed on the surface, and a solid electrolytic layer further stacked as described above), and for this reason, as compared with a case of cutting one sheet, a higher load will be required for cutting the stacked and fixed sheets, as the number of sheets stacked is increased. In contrast, in the aspect for a solid electrolytic capacitor according to the present invention, the plurality of sheets is stacked while having gaps in the groove sections, the stacked sheets are cut in the grooves (furthermore, when attention is focused on each sheet, the cut sections are reduced in thickness by the corresponding thickness of the solid electrolyte layer as described above), and the stacked sheets can be cut with a lower load than in conventional manufacturing methods. In addition, according to this aspect, a plurality of laminate chips each composed of solid electrolytic capacitor elements stacked can be obtained at a time, thereby succeeding in efficiently manufacturing laminate-type solid electrolytic capacitors including the laminate chips.

However, the first method for manufacturing a solid electrolytic capacitor according to the present invention is not limited to the aspect described above, and for example, the steps (a) to (c) may be applied to one valve-acting metal substrate, and the thus obtained sheet may be cut alone in grooves of the valve-acting metal substrate in the step (d). Also according to the aspect, as described above, the solid electrolyte layer is not substantially formed in regions corresponding to the cut sections of the grooves, and the sheet can be thus cut with a lower load. In addition, according to this aspect, a plurality of solid electrolytic capacitor elements individually separated can be obtained at a time, thereby succeeding in efficiently manufacturing laminate-type solid electrolytic capacitors including the solid electrolytic capacitor elements. Further, in this aspect, the first method for manufacturing a solid electrolytic capacitor according to the present invention can be also understood as a method for manufacturing a solid electrolytic capacitor element.

According to another aspect of the present invention, a method for manufacturing a solid electrolytic capacitor (hereinafter, referred to as a second manufacturing method) is provided, which includes:

(a) a step of providing grooves in both principal surfaces of a valve-acting metal substrate including a porous surface part and a non-porous body part to make the bottoms of the grooves non-porous, partitioning the both principal surfaces of the valve-acting metal substrate into a plurality of unit regions by the grooves, and defining a cathode layer formation part in the porous surface part for each unit region;

(b) a step of forming a dielectric layer on surfaces of the cathode layer formation parts of the valve-acting metal substrate, and of the grooves between the cathode layer formation parts;

(p) a step of applying the steps (a) to (b) to each of a plurality of valve-acting metal substrates, and stacking the thus obtained plurality of valve-acting metal substrates with the dielectric layers formed, thereby providing a laminate;

(q) a step of joining adjacent valve-acting metal substrates in the laminate to each other to obtain a joined laminate;

(r) a step of forming a solid electrolyte layer as a continuous layer so as to fill gaps between the dielectric layers formed on surfaces of cathode layer formation parts of adjacent valve-acting metal substrates in the joined laminate, and coat the outer surface of the joined laminate in the cathode layer formation parts;

(s) a step of cutting the joined laminate with the solid electrolyte layer formed, in the grooves of the valve-acting metal substrates; and (t) a step of forming a dielectric layer on the cut surfaces located around the cathode layer formation parts of the valve-acting metal substrates.

In the conventional method for manufacturing a solid electrolytic capacitor, sheets are prepared by sequentially forming a dielectric layer and a solid electrolyte layer on the surfaces of porous regions of valve-acting metal substrates, and the plurality of sheets is stacked, and then cut. In contrast, in the second manufacturing method according to the present invention, the joined laminate of the valve-acting metal substrates is prepared, then for this joined laminate, the solid electrolyte layer is formed as a continuous layer, and thereafter, cutting is carried out in the grooves of the valve-acting metal substrates. Therefore, the second method for manufacturing a solid electrolytic capacitor according to the present invention can form the solid electrolyte layer as a continuous layer at a time, and manufacture solid electrolytic capacitors more efficiently as compared with the conventional manufacturing method of forming the solid electrolyte layer for individual sheets. Furthermore, in the second method for manufacturing a solid electrolytic capacitor according to the present invention, the solid electrolyte layer is not substantially formed in regions corresponding to the cut sections of the grooves as in the first manufacturing method. Therefore, in the second method for manufacturing a solid electrolytic capacitor according to the present invention, the joined laminate with the solid electrolyte layer formed has gaps in the groove sections, the joined laminate with the solid electrolyte layer formed is cut in the grooves, and thus the sheets can be cut with a lower load than in conventional manufacturing methods. Further, this reduction in the load applied on the dielectric layer for the cutting can reduce the generation of defects in the dielectric layer, thus making it possible to reduce leakage current. Furthermore, the second method for manufacturing a solid electrolytic capacitor according to the present invention uses the valve-acting metal substrate including the porous surface part and the non-porous body part, and partitions the valve-acting metal substrate into a plurality of unit regions by providing the grooves in the both principal surfaces of the valve-acting metal substrate. Thus, commercially available valve-acting metal substrates of which surfaces have been already made porous can be used as such a valve-acting metal substrate, restrictions on the valve-acting metal substrate used are eased to increase the degree of freedom for the manufacturing method, as compared with conventional manufacturing methods.

In any of the first and second methods for manufacturing a solid electrolytic capacitor, the method for performing the step (a) is not particularly limited as long as the bottoms of the grooves are composed of the non-porous valve-acting metal substrate. In one aspect of the present invention, the grooves of the valve-acting metal substrate may be provided by pressing the valve-acting metal substrate in the thickness direction in the step (a). Alternatively, in another aspect of the present invention, the grooves of the valve-acting metal substrate may be provided by removing the porous surface part from the valve-acting metal substrate in the step (a).

In addition, in any of the first and second methods for manufacturing a solid electrolytic capacitor, it is possible to change the step (b). In one aspect of the present invention, in place of the step (b), (b') a step of forming a resist layer on the bottoms of the grooves, and forming a dielectric layer on the surfaces of the cathode layer formation parts of the valve-acting metal substrate may be carried out. According to the aspect, the bottoms of the grooves of the valve-acting metal substrate are coated with a resist layer. The resist layer typically has an insulating property, thus, the effect of reducing leakage current in the cut section with the resist layer formed and vicinity thereof can be increased because the cut sections and vicinity thereof have no charge accumulated.

According to another aspect of the present invention, a solid electrolytic capacitor element is provided, which includes:

a valve-acting metal substrate including a porous surface part, a non-porous body part, and an extended part of the non-porous body part on at least a pair of opposed sides, and including a cathode layer formation part in the porous surface part;

a dielectric layer for coating the surface of the cathode layer formation part of the valve-acting metal substrate, and the surface of the extended part of the body part in contact with the cathode layer formation part; and a solid electrolytic layer and a cathode extraction layer sequentially formed on the surface of the dielectric layer in the cathode layer formation part of the valve-acting metal substrate. It is possible to manufacture the solid electrolytic capacitor element by the first method for manufacturing a solid electrolytic capacitor according to the present invention, and the element produces a similar effect to that of the first method. In the case of manufacturing the solid electrolytic capacitor element in this way, the extended part of the body part of the valve-acting metal substrate is derived from the grooves provided in the both principal surfaces of the valve-acting metal substrate, and the end surfaces of the extended part correspond to the cut surfaces produced by cutting the grooves. Therefore, the solid electrolytic capacitor element can effectively suppress leakage current, because the end surfaces of the extended part of the body part of the valve-acting metal substrate, in other words, the cut surfaces of the valve-acting metal substrate, which are likely to cause defects, are spaced from the solid electrolyte layer.

According to another aspect of the present invention, a solid electrolytic capacitor element is provided, which includes:

a valve-acting metal substrate including a porous surface part, a non-porous body part, and an extended part of the non-porous body part on at least a pair of opposed sides, and including a cathode layer formation part in the porous surface part;

a resist layer for coating surfaces of the extended part of the body part of the valve-acting metal substrate, which are substantially parallel to principal surfaces;

a dielectric layer for coating the surface of the cathode layer formation part of the valve-acting metal substrate, and the end surface of the extended part of the body part in contact with the cathode layer formation part; and a solid electrolytic layer and a cathode extraction layer sequentially formed on the surface of the dielectric layer in the cathode layer formation part of the valve-acting metal substrate. It is possible to manufacture the solid electrolytic capacitor element by the above-described aspect modified with the step (b') from the first method for manufacturing a solid electrolytic capacitor according to the present invention, and the element produces a similar effect to that of the aspect. In the case of manufacturing the solid electrolytic capacitor element in this way, the extended part of the body part of the valve-acting metal substrate is derived from the grooves provided in the both principal surfaces of the valve-acting metal substrate, the end surfaces of the extended part correspond to the cut surfaces produced by cutting the grooves, and the surfaces of the extended part substantially parallel to the principal surfaces correspond to the bottoms of the grooves. Therefore, in the case of the solid electrolytic capacitor element, the end surfaces of the extended part of the body part of the valve-acting metal substrate, in other words, the cut surfaces of the valve-acting metal substrate, which are likely to cause defects, are spaced from the solid electrolyte layer, and moreover, the surfaces of the extended part, which are substantially parallel to the principal surfaces, in other words, the bottoms of the grooves are coated with the resist layer. The resist layer typically has an insulating property, thus, the leakage current in the cut sections with the resist layer formed and vicinity thereof can be further effectively suppressed, because the cut sections and vicinity thereof have no charge accumulated.

The solid electrolytic capacitor element according to the present invention can be included singly or plurally in a solid electrolytic capacitor. Therefore, in another aspect of the present invention, a solid electrolytic capacitor is provided which includes one, or two or more solid electrolytic capacitor elements as described above.

In another aspect of the present invention, a solid electrolytic capacitor is provided which includes a joined laminate obtained by stacking a plurality of valve-acting metal substrates each including a cathode layer formation part, and joining adjacent valve-acting metal substrates to each other, where the valve-acting metal substrates have surfaces coated with a dielectric layer at least in the cathode layer formation parts; and a continuous layer of a solid electrolyte layer for filling the gaps between the dielectric layers coating the valve-acting metal substrates in the cathode layer formation parts of the valve-acting metal substrates and coating the outer surface of the joined laminate, wherein each of the valve-acting metal substrates includes a porous surface part, a non-porous body part, and an extended part of the non-porous body part on at least a pair of opposed sides, and includes the cathode layer formation part in the porous surface part, and the dielectric layer coats the surface of the extended part of the body part in contact with the cathode layer formation part, in addition to the surface of the cathode layer formation part of the valve-acting metal substrate. It is possible to manufacture the solid electrolytic capacitor by the second method for manufacturing a solid electrolytic capacitor according to the present invention, and the capacitor produces a similar effect to that of the first method. In addition, the solid electrolytic capacitor has no cathode extraction layer in the gaps between the valve-acting metal substrates constituting the joined laminate, thus making it possible to achieve a lower-profile capacitor.

In another aspect of the present invention, a solid electrolytic capacitor is provided which includes:

a joined laminate obtained by stacking a plurality of valve-acting metal substrates each including a cathode layer formation part, and joining adjacent valve-acting metal substrates to each other, where the valve-acting metal substrates have surfaces coated with a dielectric layer at least in the cathode layer formation parts; and a continuous layer of a solid electrolyte layer for filling the gaps between the dielectric layers coating the valve-acting metal substrates in the cathode layer formation parts of the valve-acting metal substrates and coating the outer surface of the joined laminate, wherein each of the valve-acting metal substrates includes a porous surface part, a non-porous body part, and an extended part of the non-porous body part on at least a pair of opposed sides, and includes the cathode layer formation part in the porous surface part, the surfaces of the extended part of the body part of the valve-acting metal substrate, which are substantially parallel to principal surfaces, are coated with a resist layer, and the dielectric layer coats the surface of the extended part of the body part in contact with the cathode layer formation part, in addition to the surface of the cathode layer formation part of the valve-acting metal substrate. It is possible to manufacture the solid electrolytic capacitor by the above-described aspect modified with the step (b') from the second method for manufacturing a solid electrolytic capacitor according to the present invention, and the capacitor produces a similar effect to that of the aspect. In the case of manufacturing the solid electrolytic capacitor in this way, the extended part of the body part of the valve-acting metal substrate is derived from the grooves provided in the both principal surfaces of the valve-acting metal substrate, the end surfaces of the extended part correspond to the cut surfaces produced by cutting the grooves, and the surfaces of the extended part substantially parallel to the principal surfaces correspond to the bottoms of the grooves. Therefore, in the case of the solid electrolytic capacitor, the end surfaces of the extended part of the body part of the valve-acting metal substrate, in other words, the cut surfaces of the valve-acting metal substrate, which are likely to cause defects, are spaced from the solid electrolyte layer, and moreover, the surfaces of the extended part, which are substantially parallel to the principal surfaces, in other words, the bottoms of the grooves are coated with the resist layer. The resist layer typically has an insulating property, thus, the leakage current in the cut sections with the resist layer formed and vicinity thereof can be further effectively suppressed, because the cut sections and vicinity thereof have no charge accumulated. In addition, the solid electrolytic capacitor has no cathode extraction layer in the gaps between the valve-acting metal substrates constituting the joined laminate, thus making it possible to achieve a lower-profile capacitor.

According to the present invention, a novel method for manufacturing a solid electrolytic capacitor can be provided, which can reduce the generation of defects in dielectric layer, which could lead to an increase in leakage current, and which has eased restrictions on a valve-acting metal substrate used. Further, according to the present invention, a solid electrolytic capacitor element and a solid electrolytic capacitor are also provided, which can be manufactured by the method for manufacturing a solid electrolytic capacitor.

BRIEF EXPLANATION OF THE DRAWINGS

FIG. 6(a) is a schematic top view corresponding to FIG. 2A(a), and FIG. 6(b) is a schematic top view of FIG. 6(a) with a resist layer formed thereon.

FIGS. 7(a) and 7(b) are schematic perspective views of solid electrolytic capacitor elements respectively obtained after cutting and after the formation of a dielectric layer.

FIG. 13(a) is a schematic top view showing the forming positions of joints P, Q, whereas FIG. 13(b) is a schematic top view showing the forming positions of joints $P_1$, $P_2$, Q.

DETAILED DESCRIPTION OF THE INVENTION

Figure 1A:
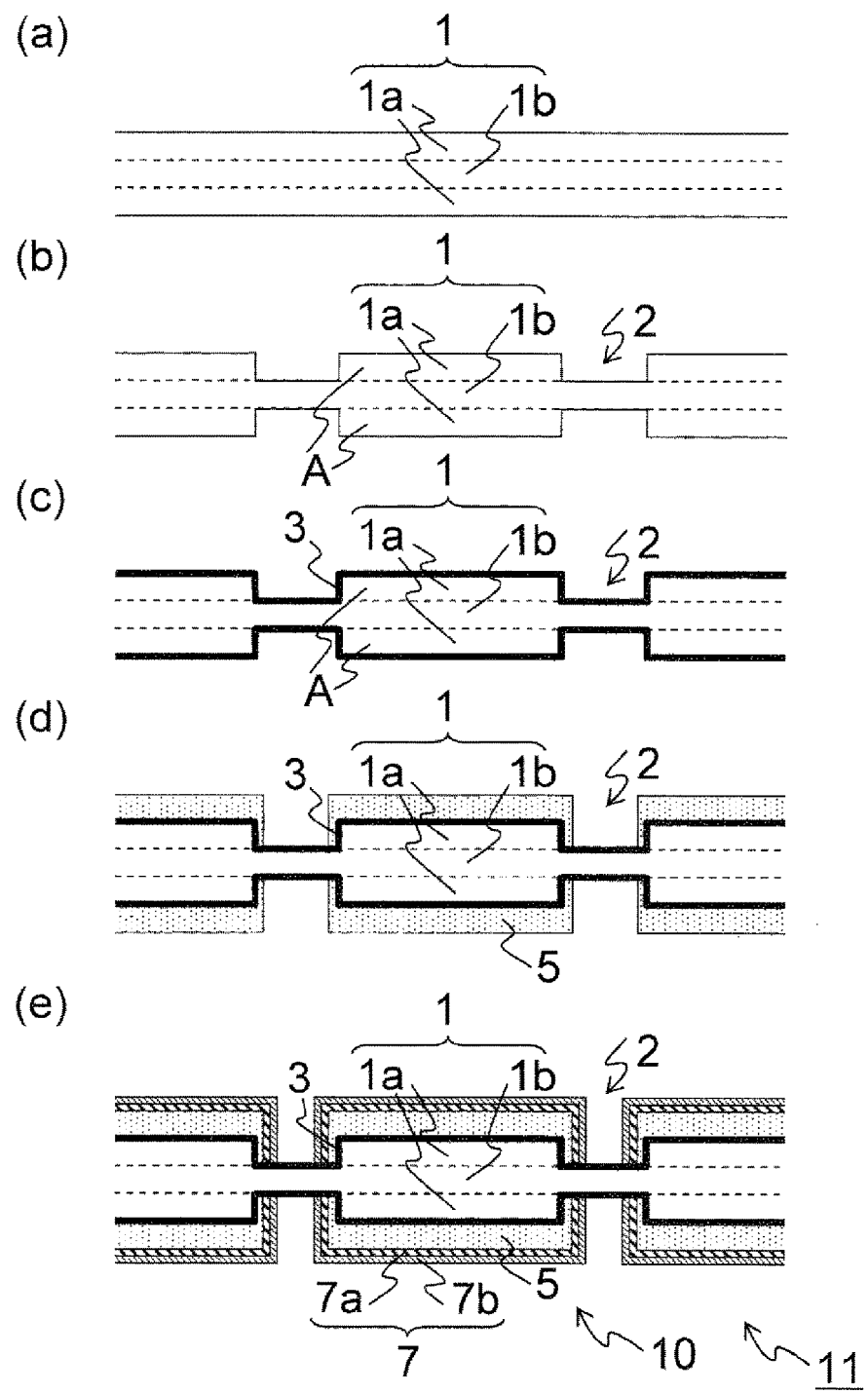
FIG. 1A shows schematic cross-sectional process diagrams for illustrating the first half of a first method for manufacturing a solid electrolytic capacitor according to Embodiment 1 of the present invention, where FIG. 1A(b) is a schematic cross-sectional process diagram of a valve-acting metal substrate virtually cut along the line $X_1$-$X_1$ of FIG. 2A(a) and FIG. 2B(a).

Various embodiments of the present invention will be described below in detail with reference to the drawings. In the figures, like members are denoted by the same reference numerals, and the same descriptions apply thereto unless otherwise noted. It is to be noted that the accompanying drawings schematically illustrate the present invention for easy understanding, which are not necessarily shown to scale.

Embodiment 1

The present embodiment relates to a first method for manufacturing a solid electrolytic capacitor according to an embodiment of the present invention. The manufacturing method, and a solid electrolytic capacitor element and a solid electrolytic capacitor manufactured by the method will be described below.

First, as shown in FIG. 1A(a), a valve-acting metal substrate 1 is prepared which includes a porous surface part 1a and a non-porous main part 1b. More specifically, the valve-acting metal substrate 1 is structured to have the non-porous main part 1b sandwiched by the porous surface part 1a.

The valve-acting metal substrate 1 is substantially composed of a so-called valve-acting metal material. The metal material is selected from the group consisting of, for example, aluminum, tantalum, niobium, titanium, zirconium, and alloys of two or more of these metals, and preferably, is aluminum or an alloy containing aluminum.

The valve-acting metal substrate 1 can have the form of a sheet (or a plate, for example, foil). The thickness of the valve-acting metal substrate 1 is not particularly limited, but for example, 50 to 200 µm, and preferably 90 to 130 µm. The width and length of the valve-acting metal substrate 1 can be selected appropriately depending on the size of the solid electrolytic capacitor (or solid electrolytic capacitor element) manufactured.

Specifically, the valve-acting metal substrate 1 including the porous surface part 1a and the non-porous body part 1b can be obtained by applying surface roughening in advance to a metal matrix (non-porous) of the valve-acting metal material. The surface roughening is typically carried out by etching. The surface part of the metal matrix, which is subjected to the action of etching in contact with an etching liquid, serves as the porous surface part 1a, whereas the body part (or inside) of the metal matrix, which is not subjected to the action of etching without coming into contact with the etching solution, serves as the non-porous body part 1b. The conditions for the etching, for example, the etching liquid, the temperature and time of the etching, etc. can be selected appropriately depending on the metal material of the valve-acting metal substrate used, desired electrical characteristics (including the effective area), etc. For example, hydrochloric acid and the like can be used for the etching liquid.

The one-side thickness (depth from one surface) of the porous surface part 1a is not to be considered particularly limited, but for example, 10 to 100 µm, and preferably 20 to 60 µm. The thickness of the non-porous body part (core part) 1b is not to be considered particularly limited, but for example, 10 to 60 and preferably 20 to 40 µm. However, these thicknesses are merely by way of example, and the thicknesses of the porous surface part 1a and the non-porous body part 1b can be varied depending on the thickness of the metal matrix used, the conditions for the etching, etc.

The porous surface part 1a included in the valve-acting metal substrate 1 increases the surface area of the valve-acting metal substrate 1. The valve-acting metal substrate 1 functions as an anode in the solid electrolytic capacitor, and thus, even in the case of the same occupied area, the increased surface area, that is, effective area of the valve-acting metal substrate 1 can increase the electrostatic capacitance of the capacitor.

It is to be noted that as for the valve-acting metal substrate 1, valve-acting metal matrices roughened by etching are commercially available for solid electrolytic capacitors. These commercially available products may be cut and used as the valve-acting metal substrate 1.

Next, as shown in FIG. 1A(b), grooves 2 are provided in both principal surfaces (the upper surface and lower surface of the valve-acting metal substrate 1, which are surfaces perpendicular to the plane of paper in FIG. 1A) of the valve-acting metal substrate 1 including the porous surface part 1a and the non-porous body part 1b. In this case, the valve-acting metal substrate 1 has the grooves 2 formed such that the grooves 2 have non-porous bottoms.

Specifically, the grooves 2 of the valve-acting metal substrate 1 can be provided by pressing the valve-acting metal substrate 1 in the thickness direction. The pressing can be carried out by, for example, pressing regions where the grooves 2 should be formed from above and below while keeping the valve-acting metal substrate 1 hollow. The pressing force is not particularly limited, but can be set, for example, from 100 to 500 MPa. After the pressing, the grooves 2 are formed in the both principal surfaces of the valve-acting metal substrate 1, and the bottoms of the grooves 2 are made non-porous (not shown) in such a way that the porous surface part 1a present on the surface of the originally present non-porous body part 1b is pressed (crushed) against the non-porous body part 1b. It is to be noted that while the part of the valve-acting metal substrate 1 between the opposed grooves 2 refers to the original body part (non-porous) with the crushed surface part (non-porous) added thereto in this case, the part including the crushed part will be simply referred to as the non-porous body part 1 for ease of explanation in this specification.

Alternatively, the grooves 2 of the valve-acting metal substrate 1 can be also provided by removing the porous surface part from the valve-acting metal substrate. The removal can be carried out by, for example, laser irradiation or the like. After the removal, the grooves 2 are formed in the both principal surfaces of the valve-acting metal 1, and the bottoms of the grooves 2 are made non-porous (see FIG. 1A(b)) in such a way that the originally present non-porous body part 1b is exposed. It is to be noted that while the part of the valve-acting metal substrate 1 between the opposed grooves 2 may be obtained by partially removing the original body part in addition to the original surface part (porous) in this case, the part will be simply referred to as the non-porous body part 1 for ease of explanation in this specification.

Figure 2A:
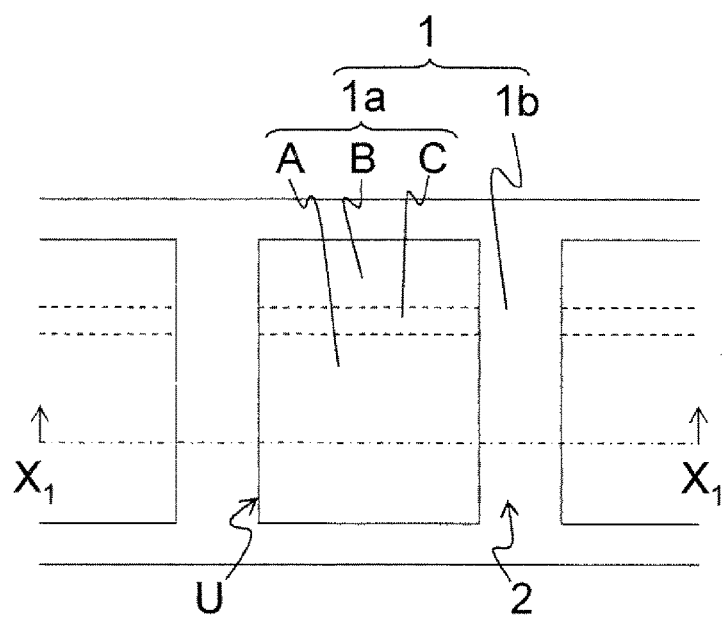
FIG. 2A shows diagrams for illustrating the first method for manufacturing a solid electrolytic capacitor according to Embodiment 1 of the present invention, where FIG. 2A(a) is a schematic top view of FIG. 1A(b) as an example, and FIG. 2A(b) is a schematic top view of FIG. 2A(a) with a resist layer formed thereon.
Figure 2A:
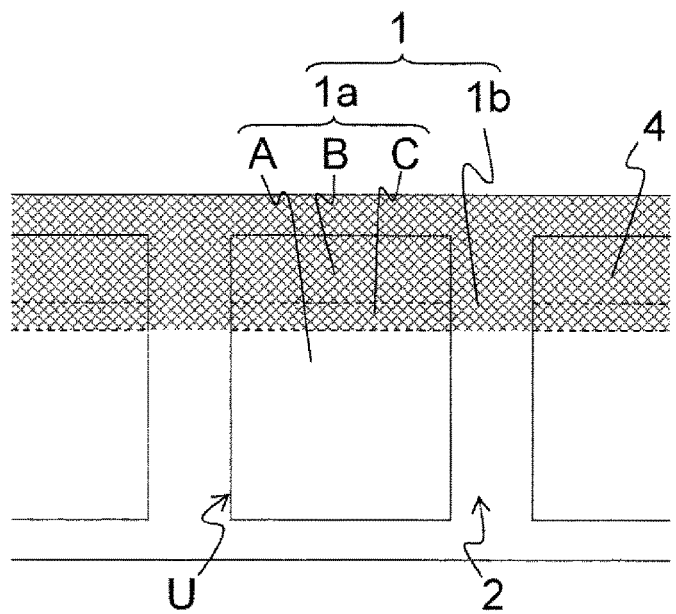
Figure 2B:
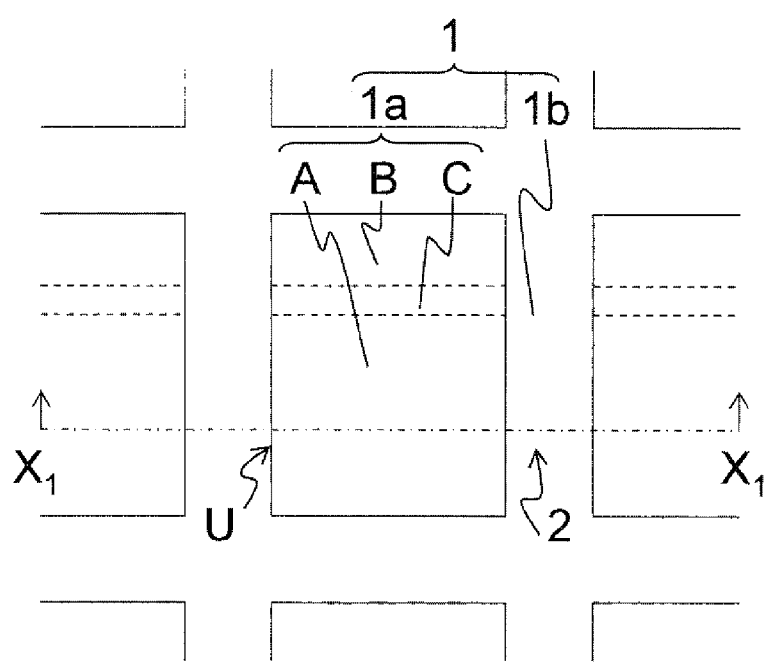
FIG. 2B shows diagrams for illustrating the first method for manufacturing a solid electrolytic capacitor according to Embodiment 1 of the present invention, where FIG. 2B(a) is a schematic top view of FIG. 1A(b) as another example, and FIG. 2B(b) is a schematic top view of FIG. 2B(a) with a resist layer formed thereon.
Figure 2B:
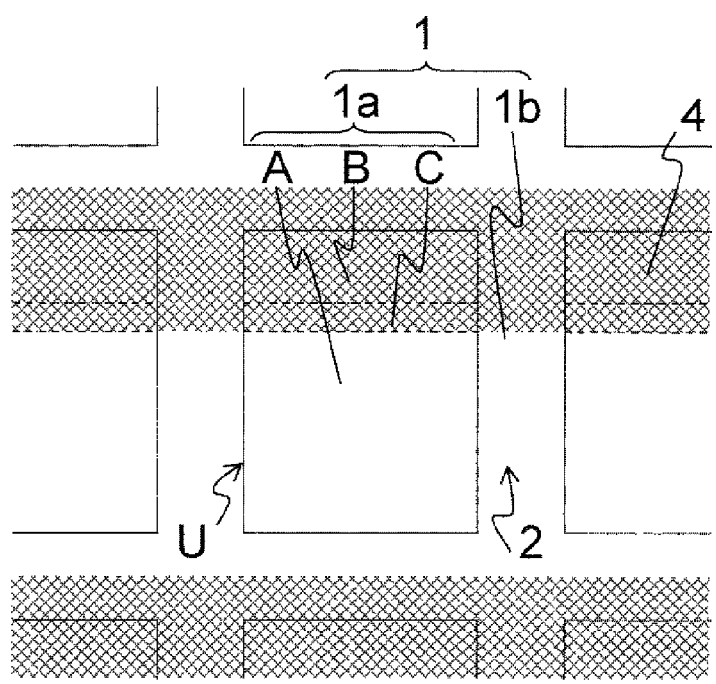

The grooves 2 are formed so as to partition the both principal surfaces of the valve-acting metal substrate 1 into a plurality of unit regions U. For example, as shown in FIG. 2A(a), a plurality of unit regions U lined up in a row may be partitioned from each other by a groove 2 surrounding the unit regions U. Alternatively, for example, as shown in FIG. 2B(a), a plurality of unit regions U arranged in a matrix may be partitioned from each other by a grid-like groove 2. The width of the groove 2 and the size of the unit region U can be set appropriately.

In regard to the valve-acting metal substrate 1, a cathode layer formation part A is defined in the porous surface part 1a for each of the unit regions U. In addition, in the present embodiment, an anode lead part B and a spacing part C for spacing between the cathode layer formation part A and the anode lead part B are further defined in the porous surface part 1a for each of the unit regions U.

It is to be noted that while the unit regions U are shown in the figures to have rectangular shapes at the both principal surfaces, with the grooves 2 formed along the four peripheral sides of the rectangular unit regions U in the present embodiment, the present invention is not limited to this embodiment. The unit regions U can have any appropriate shape. In addition, the grooves 2 can be provided in any appropriate positions, as long as the plurality of unit regions U can be divided individually by cutting at the grooves 2 in a step as will be described later.

Next, as shown in FIG. 1A(c), a dielectric layer 3 is formed on the surfaces of the cathode layer formation part A in the porous surface part 1a of the valve-acting metal substrate 1, and the section of the grooves 2 located between mutually adjacent cathode layer formation parts A. The dielectric layer 3 may be, for example, as shown in FIG. 2A(b) and FIG. 2B(b), an oxide layer formed by coating the anode lead part B and spacing part C of the valve-acting metal substrate 1, as well as the section of the grooves 2 adjacent thereto, with a resist layer 4, and immersing the valve-acting metal substrate 1 in an electrolyte solution to apply anodization (hereinafter, also referred to as a chemical conversion treatment, as the case may be). In this case, the dielectric layer (oxide layer) 3 is formed on the surface part of the valve-acting metal substrate 1, which is not coated with the resist layer 4. The conditions for the anodization, for example, the electrolyte solution, the temperature, time, current density, and voltage, can be selected appropriately depending on the metal material of the valve-acting metal substrate used, desired electrical characteristics, etc. For example, as the electrolyte solution, an aqueous solution or the like can be used which contains at least one selected from the group consisting of boric acid, phosphoric acid, adipic acid, and sodium salts and ammonium salts thereof. The resist layer 4 is removed after the anodization.

Next, as shown in FIGS. 1A(d) and 1A(e), a solid electrolyte layer 5 and a cathode extraction layer 7 are sequentially formed on the surface of the dielectric layer 3 formed on the cathode layer formation part A in the porous surface part 1a of the valve-acting metal substrate 1.

Figure 3A:
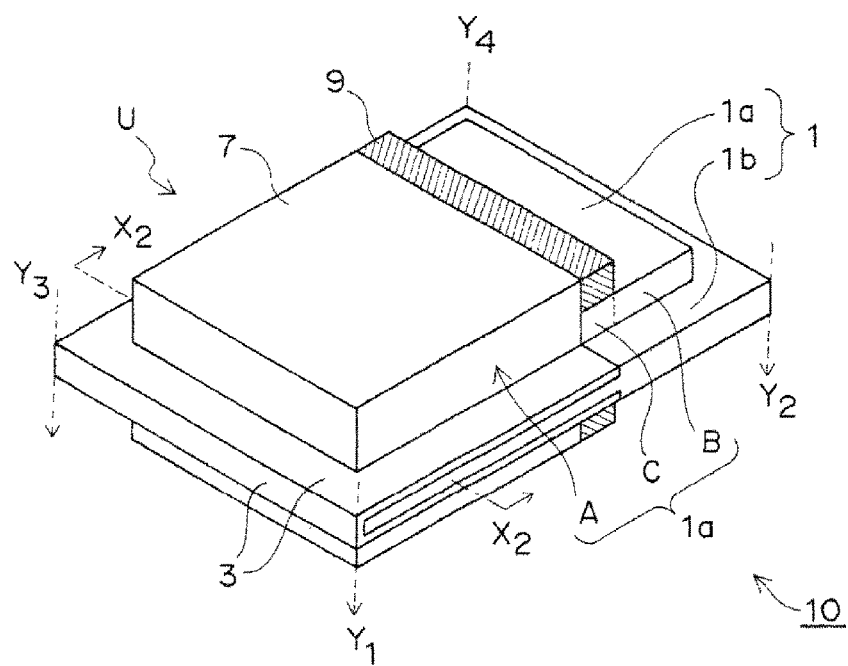
FIG. 3A shows diagrams for illustrating the first method for manufacturing a solid electrolytic capacitor according to Embodiment 1 of the present invention, where FIGS. 3A(a) and 3A(b) are schematic perspective views of solid electrolytic capacitor elements respectively obtained after cutting and after the formation of a dielectric layer in the case of the example shown in FIG. 2A.
Figure 3A:
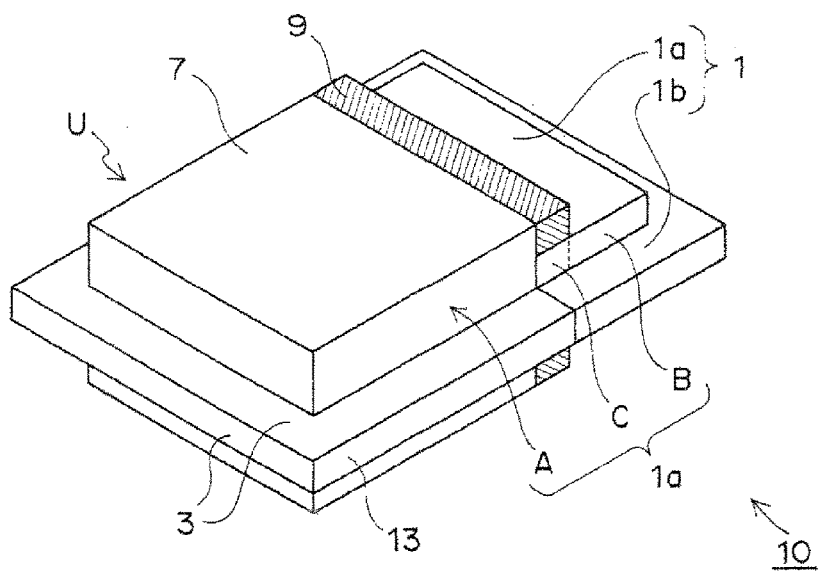
Figure 3B:
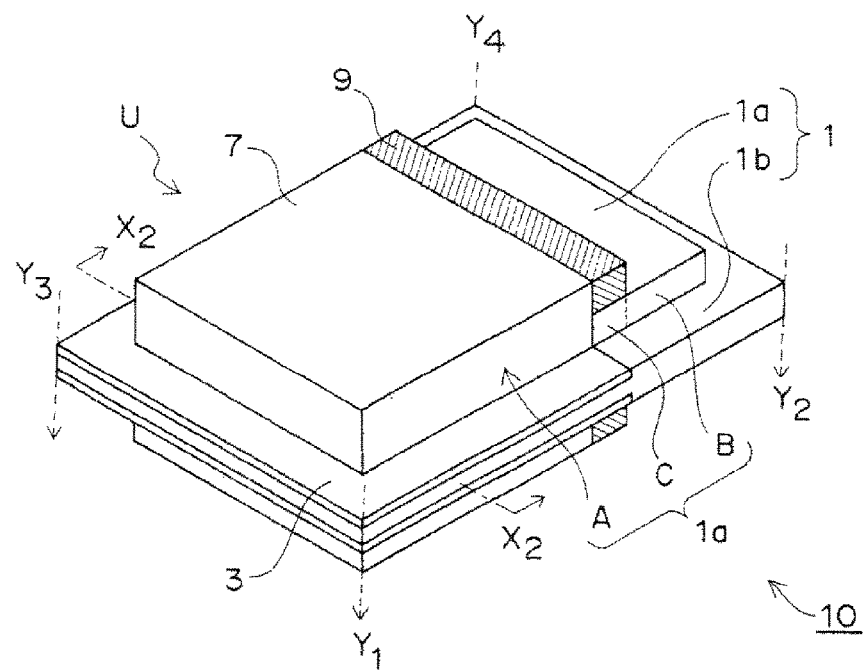
FIG. 3B shows diagrams for illustrating the first method for manufacturing a solid electrolytic capacitor according to Embodiment 1 of the present invention, where FIGS. 3B(a) and 3B(b) are schematic perspective views of solid electrolytic capacitor elements respectively obtained after cutting and after the formation of a dielectric layer in the case of the example shown in FIG. 2B.
Figure 3B:
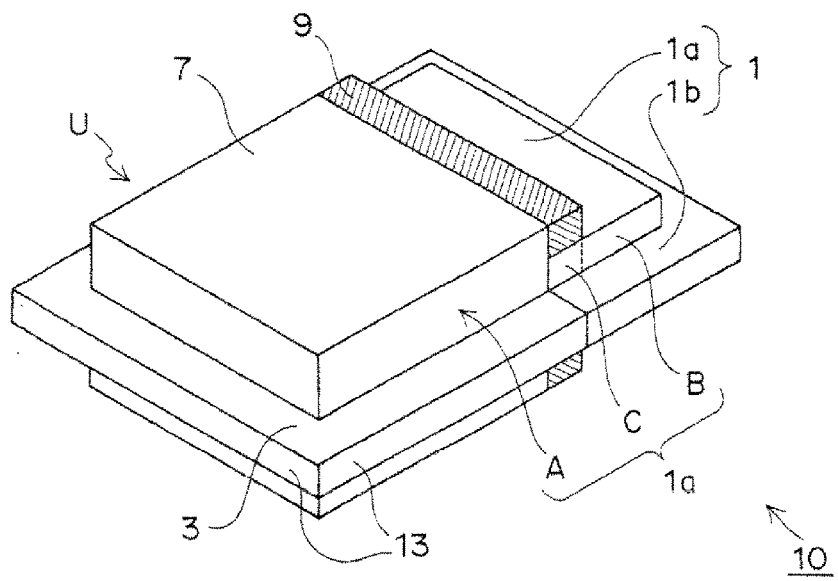

Specifically, first, for the valve-acting metal substrate 1 with the dielectric layer 3 formed, which is obtained in the way described above, an insulating part 9 is formed so as to coat the spacing part C in the porous surface part 1a of the valve-acting metal substrate 1 (see the insulating part 9 shown in FIG. 3A(a) and FIG. 3B(a)).

The insulating part 9 can be formed by applying and curing an insulating resin. Specific examples thereof include polyphenylsulfone (PPS), polyethersulfone (PES), cyanate ester resins, fluorine resins (tetrafluoroethylene, tetrafluoroethylene-perfluoroalkylvinylether copolymer, etc.), low molecular weight polyimide, and derivatives and precursors thereof, and in particular, low molecular weight polyimide, polyethersulfone, fluorine resins and precursors thereof.

Then, the solid electrolyte layer 5 is formed. In the case of the example shown in FIG. 2A, the solid electrolyte layer 5 can be formed by immersing the cathode layer formation part A in a solution of a conductive polymer precursor (raw material solution) before the insulating part 9, and applying and drying the solution of the conductive polymer precursor onto the surface of the dielectric layer 3 formed on the surface of the cathode layer formation part A, while holding the suspended anode lead part B of the valve-acting metal substrate 1. In addition, in the case of the example shown in FIG. 2B, the solid electrolyte layer 5 can be formed by applying and drying a solution of a conductive polymer precursor onto the surface of the dielectric layer 3 formed on the surfaces of the section with the cathode layer formation part A of the valve-acting metal substrate 1 located, and of the groove between the cathode layer formation parts A.

In this case, the solid electrolyte layer 5 is, as shown in FIG. 1A(d), formed on the surface of the dielectric layer 3 formed on the cathode layer formation part A of the valve-acting metal substrate 1, but not substantially formed on the bottoms of the grooves 2, more specifically, in regions corresponding to cut sections as will be described later. The cathode layer formation part A constitutes the porous surface part 1a of the valve-acting metal substrate 1, and maintains the porous property even after the dielectric layer 3 is formed on the surface of the cathode layer formation part A. In contrast, the grooves 2 have non-porous bottoms, and the bottoms maintain the non-porous property even after the dielectric layer 3 is formed on the surfaces of the grooves 2 between the cathode layer formation parts A. Under these circumstances, the solution of the conductive polymer precursor selectively permeates the porous cathode layer formation part A by capillary action. For this reason, the solid electrolyte layer 5 is not substantially formed on the surface of the region spaced from the cathode layer formation part A (at least the regions corresponding to the cut sections as described later), as for the non-porous bottoms of the grooves 2.

Examples of the conductive polymer forming the solid electrolyte layer 5 include, but not limited to, for example, polymers including, as repeating units, structures represented by compounds having a thiophene skeleton, compounds having a polycyclic sulfide skeleton, compounds having a pyrrole skeleton, compounds having a furan skeleton, and compounds having an aniline skeleton.

Any appropriate solution can be used for the solution of the conductive polymer precursor (raw material solution). For example, two types of solutions may be used: a solution containing a monomer and a solution containing a polymerization oxidizing agent and a dopant used separately if necessary, the cathode layer formation part A coated with the dielectric layer 3 may be immersed sequentially in these solutions, or these solutions may be applied sequentially thereto, and the series of operations for immersion or application may be repeated, if necessary. However, the present invention is not limited to this example, and one type of solution containing a monomer and a polymerization oxidizing agent, and a dopant if used, may be used.

Then, as shown in FIG. 1A(e), a cathode extraction layer 7 is formed on the surface of the solid electrolyte layer 5. The cathode extraction layer 7 can be typically formed in such a way that a carbon-containing layer 7a is formed by applying and drying a carbon paste so as to coat the outer surface of the solid electrolyte layer 5, and a silver-containing layer 7b is then formed by applying and drying a silver paste so as to coat the outer surface of the carbon-containing layer 7a.

As a result, the anode lead part B of the valve-acting metal substrate 1 is exposed to the outside of the solid electrolyte layer 5 and cathode extraction layer 7 while the anode lead part B is electrically insulated by the insulating part 9 from the solid electrolyte layer 5 and the cathode extraction layer 7.

Thus, a sheet 11 is obtained for which a plurality of solid electrolytic capacitor elements 10 corresponding to the plurality of unit regions U is prepared integrally with the grooves 2 interposed therebetween (see FIG. 1A(e)).

Figure 1B:
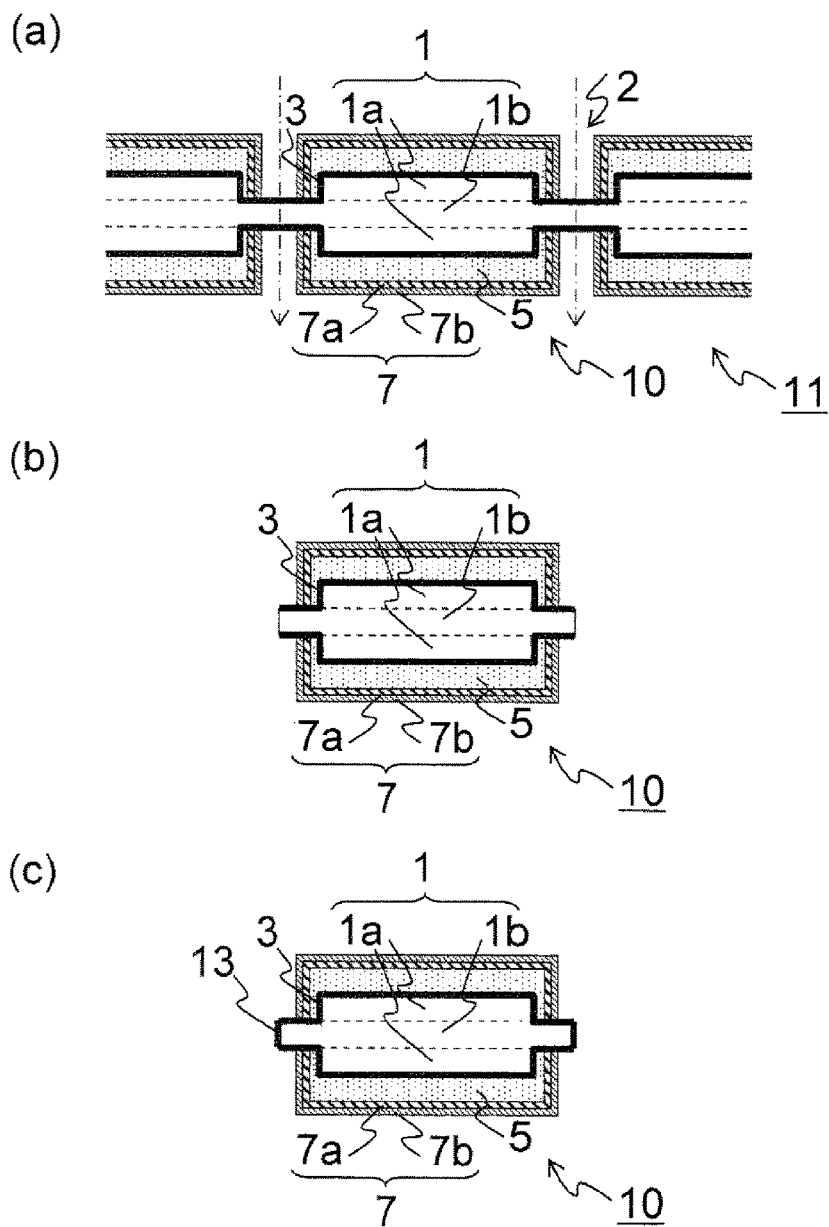
FIG. 1B shows schematic cross-sectional process diagrams for illustrating the second half of the first method for manufacturing a solid electrolytic capacitor according to Embodiment 1 of the present invention, where FIG. 1B(b) is a schematic cross-sectional process diagram of the valve-acting metal substrate virtually cut along the line $X_2$-$X_2$ of FIG. 3A(a) and FIG. 3B(a).

Next, the sheet 11 obtained in the way described above is cut in the grooves 2 of the valve-acting metal substrate 1 as shown in FIG. 1B(a) (the cuts are schematically shown by arrows of dashed-dotted lines in the figure). The cut section of the groove 2 has the valve-acting metal substrate 1 and the dielectric layer 3, whereas the cut section has no solid electrolyte layer 5. The cutting can be carried out by, for example, by dicing, a disc cutter, force cutting, or the like.

After the cutting, as shown in FIG. 1B(b), the solid electrolytic capacitor elements 10 are individually divided (one of the solid electrolytic capacitor elements 10 divided is shown in the figure).

The valve-acting metal substrate 1 included in the divided solid electrolytic capacitor element 10 has an extended part (or convex part) of the non-porous body part 1b on at least a pair of opposed sides, in the present embodiment, on the sides located at the four peripheral sides of the rectangular unit region U as shown in FIG. 3A(a) and FIG. 3B(a). This extended part of the main part 1b is the rest after cutting the non-porous body part 1b at the grooves 2 and a section projecting from the ends of the porous surface part 1a.

At the cut surfaces produced by the cutting, the body part 1b of the valve-acting metal substrate 1 is exposed from the dielectric layer 3 (see FIG. 1B(b)). In the case of the example shown in FIG. 2A (when the plurality of unit regions U lined up in a row is partitioned from each other by the grooves 2 surrounding the unit regions U), as shown in FIG. 3A(a), the surface including lines $Y_1$ and $Y_2$ and the surface including lines $Y_3$ and $Y_4$ are regarded as cut surfaces, and at these two cut surfaces, the body part 1b of the valve-acting metal substrate 1 is exposed from the dielectric layer 3. In the case of the example shown in FIG. 2B (when the plurality of unit regions U arranged in a matrix is partitioned from each other by the grid-like grooves 2), as shown in FIG. 3B(a), the surface including lines $Y_1$ and $Y_2$, the surface including lines $Y_3$ and $Y_4$, the surface including lines $Y_1$ and $Y_3$, and the surface including lines $Y_2$ and $Y_4$ are regarded as cut surfaces, and at these four cut surfaces, the body part 1b of the valve-acting metal substrate 1 is exposed from the dielectric layer 3.

Next, as shown in FIG. 1B(c), a dielectric layer 13 is formed on the cut surfaces. This dielectric layer 13 may be, as shown in FIG. 3A(b) and FIG. 3B(b), formed on at least the cut surfaces located around the cathode layer formation part A of the valve-acting metal substrate 1, among the cut surfaces. The dielectric layer 13 may be an oxide layer formed by immersing at least the cathode layer formation part A of the divided solid electrolytic capacitor element 10 in an electrolyte solution to apply anodization. The conditions for the additional anodization can be the same conditions as for the anodization described above for the dielectric layer 3.

The surface of the cathode layer formation part A of the valve-acting metal substrate 1 and the surface of the extended part of the body part 1b in contact with the cathode layer formation part A are coated with the dielectric layers 3 and 13.

Thus, the solid electrolytic capacitor element 10 as shown in FIG. 1B(c), FIG. 3A(b), and FIG. 3B(b) is prepared in accordance with the first manufacturing method according to the present embodiment. The solid electrolytic capacitor element 10 includes:

the valve-acting metal substrate 1 which has the porous surface part 1a, the non-porous body part 1b, and the extended part of the non-porous body part 1b on at least a pair of opposed sides, and has the cathode layer formation part A in the porous surface part 1a;

the dielectric layers 3 and 13 for coating the surface of the cathode layer formation part A of the valve-acting metal substrate 1, and the surface of the extended part of the body part 1b in contact with the cathode layer formation part A; and the solid electrolytic layer 5 and the cathode extraction layer 7 sequentially formed on the surface of the dielectric layer 3 in the cathode layer formation part A of the valve-acting metal substrate 1.

In the solid electrolytic capacitor element 10, the extended part of the body part 1b of the valve-acting metal substrate 1 is derived from the grooves 2 provided in the both principal surfaces of the valve-acting metal substrate 1, and the end surfaces of the extended part correspond to the cut surfaces produced by cutting the grooves 2. The extended part of the body part 1b may be identical to the non-porous body part 1b of the initially prepared valve-acting metal substrate 1 shown in FIG. 1A(a), or different therefrom depending on the method for forming the grooves 2. The solid electrolytic capacitor element 10 can effectively suppress leakage current, because the end surfaces of the extended part of the body part 1b of the valve-acting metal substrate 1, in other words, the cut surfaces of the valve-acting metal substrate 1, which are likely to cause defects, are spaced from the solid electrolyte layer 5.

The solid electrolytic capacitor element 10 can be included singly or plurally in a solid electrolytic capacitor.

In the case of using the solid electrolytic capacitor element 10 singly, a solid electrolytic capacitor can be obtained in such a way that, for example, the anode lead part B of the valve-acting metal substrate 1 is connected to an anode terminal, whereas the cathode extraction layer 7 is connected to a cathode terminal, and the solid electrolytic capacitor element is sealed with an insulating resin such as an epoxy resin, with the anode terminal and cathode terminal (for example, lead frames) at least partially exposed.

Figure 4:
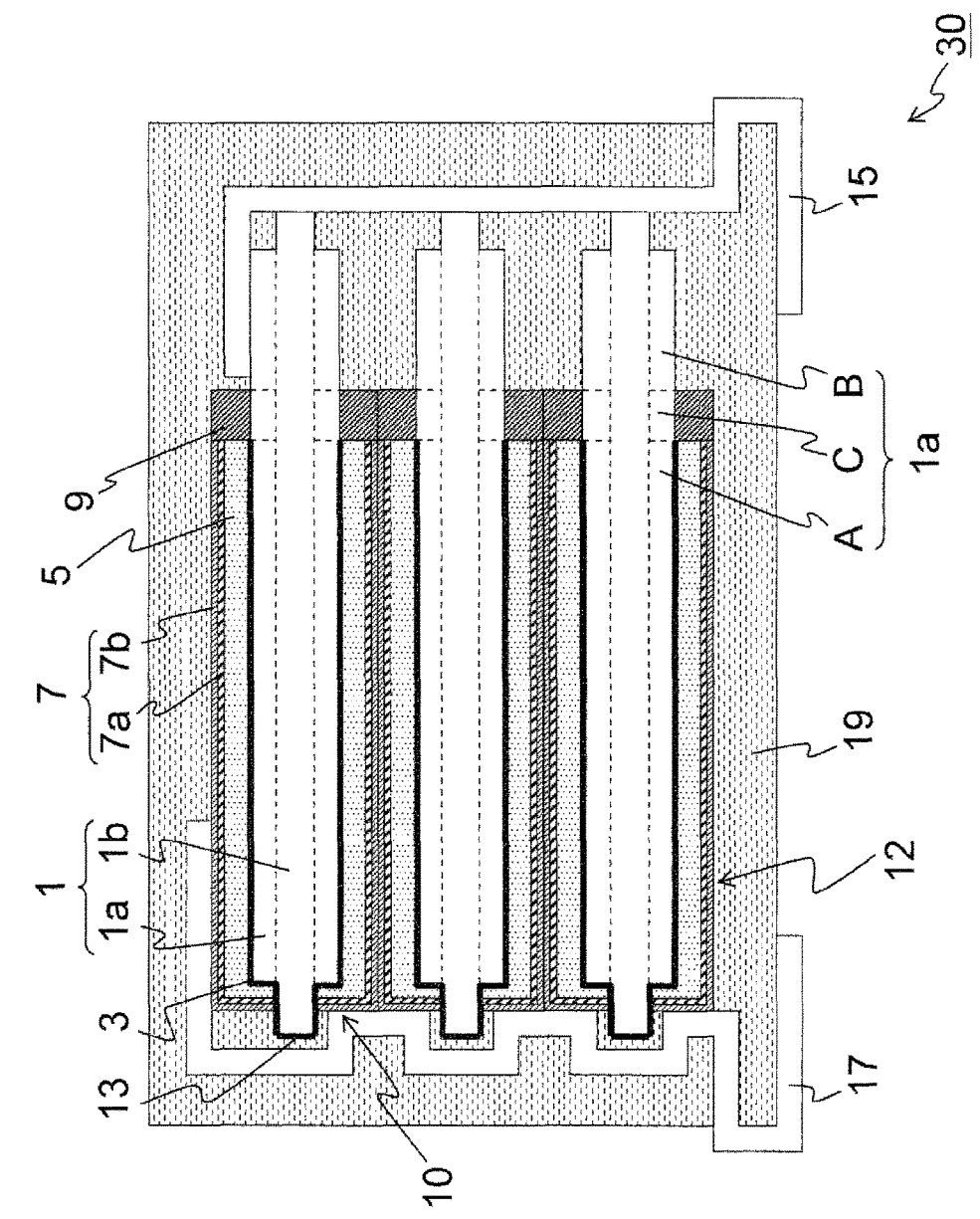
FIG. 4 is a schematic cross-sectional view illustrating a solid electrolytic capacitor manufactured by the first method for manufacturing a solid electrolytic capacitor according to Embodiment 1 of the present invention and Embodiment 2 as a modification example thereof.

In the case of using a plurality of the solid electrolytic capacitor elements 10, a laminate-type solid electrolytic capacitor 30 can be obtained in such a way that, for example, as shown in FIG. 4, the solid electrolytic capacitor elements 10 are stacked plurally to provide a laminate chip 12 (in the figure, a laminate chip 12 of solid electrolytic capacitor elements is shown which is composed of three solid electrolytic capacitor elements 10 by way of example), the anode lead parts B of the valve-acting metal substrates 1 are connected to an anode terminal 15, whereas the cathode extraction layers 7 are connected to a cathode terminal 17, and the laminate chip 12 is sealed with an insulating resin 19 such as an epoxy resin, with the anode terminal 15 and cathode terminal 17 (for example, lead frames) at least partially exposed.

Thus, a solid electrolytic capacitor including one, or two or more of the solid electrolytic capacitor elements is manufactured in accordance with the first manufacturing method according to the present invention.

According to the present embodiment, the solid electrolyte layer 5 is not substantially formed in the regions corresponding to the cut sections of the grooves 2, and the sheet 11 can be thus cut with a lower load than in conventional manufacturing methods, thereby succeeding in reducing the generation of defects in the dielectric layer 3, and thus making it possible to reduce leakage current. Furthermore, according to the present embodiment, commercially available valve-acting metal substrates with surfaces which have been already made porous can be used as the valve-acting metal substrate 1, and restrictions on the valve-acting metal substrate used are eased, as compared with conventional manufacturing methods.

Embodiment 2

The present embodiment relates to a modification example of the first method for manufacturing a solid electrolytic capacitor according to Embodiment 1 as described above. The manufacturing method according to the modification example, and a solid electrolytic capacitor manufactured by the method will be described below.

First, in the same way as described in Embodiment 1 with reference to FIGS. 1A(a) to 1A(e), a plurality of sheets 11 is prepared for which a plurality of solid electrolytic capacitor elements 10 corresponding to a plurality of unit regions U is prepared integrally with grooves 2 interposed therebetween.

Next, the plurality of sheets 11 obtained in the way described above is, as shown in FIG. 5(a), stacked so that the unit regions U of the respective sheets 11 are aligned in the thickness direction (while three sheets 11 are stacked by way of example in the figure, the embodiment is not limited to this example), and the plurality of sheets 11 stacked is cut in the grooves 2 of the valve-acting metal substrate 1 (the cuts are schematically shown by arrows of dashed-dotted lines in the figure). The cut section of the groove 2 has the valve-acting metal substrate 1 and the dielectric layer 3, whereas the cut section has no solid electrolyte layer 5. The cutting can be carried out in the same way as in Embodiment 1.

Figure 5:
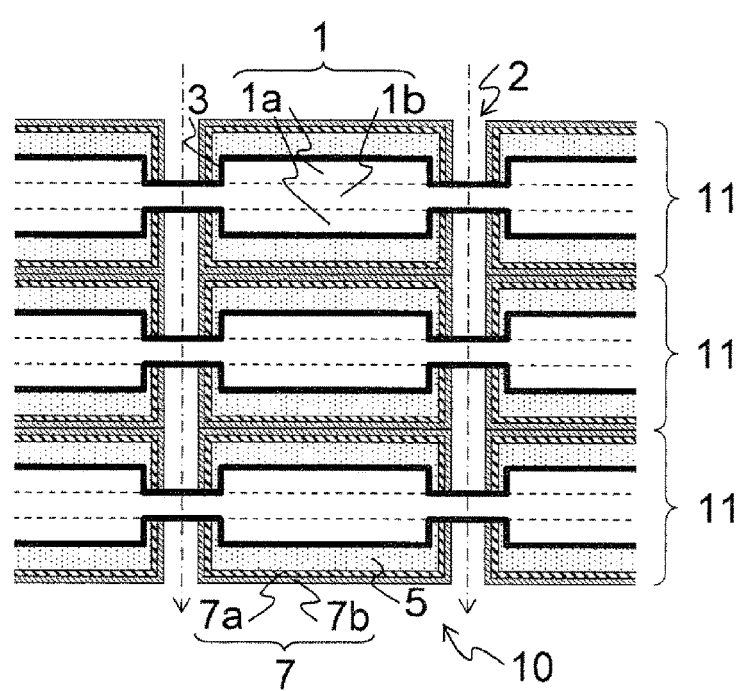
FIG. 5 shows diagrams for illustrating the first method for manufacturing a solid electrolytic capacitor according to Embodiment 2 of the present invention, which shows schematic cross-sectional process diagrams corresponding to FIG. 1B.
Figure 5:
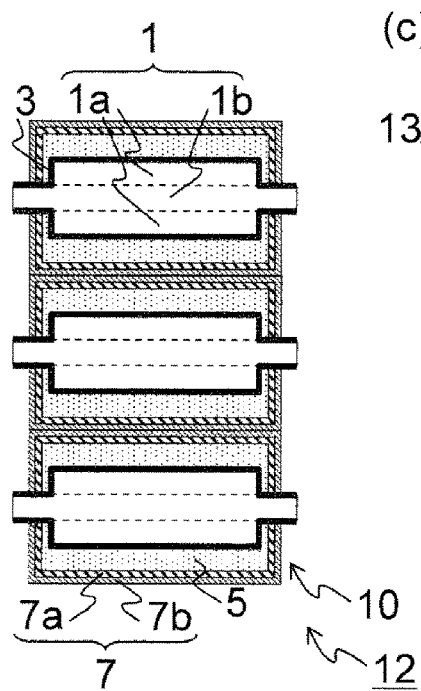
Figure 5:
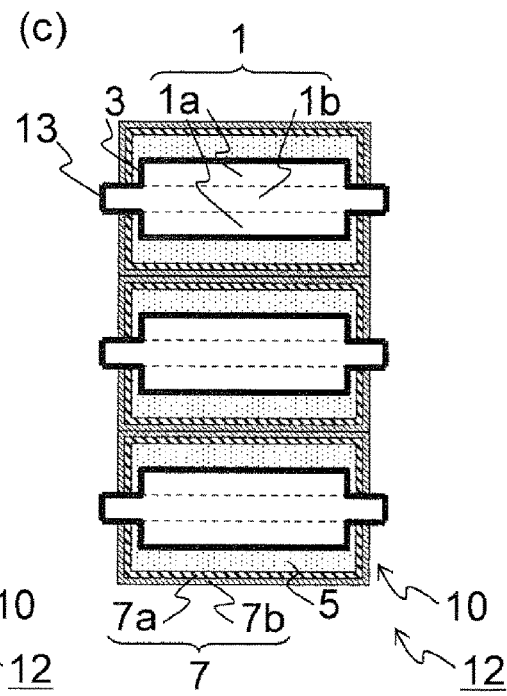

After the cutting, as shown in FIG. 5(b), the stacked solid electrolytic capacitor elements 10 are divided for each unit region U (from laminate chips 12 of solid electrolytic capacitor elements, which are composed of three solid electrolytic capacitor elements 10 by way of example, one divided laminate chip 12 is shown in the figure).

In the divided laminate chip 12, the valve-acting metal substrate 1 included in each solid electrolytic capacitor element 10 has an extended part (or convex part) of the non-porous body part 1b on at least a pair of opposed sides, in the present embodiment, on the sides located at the four peripheral sides of the rectangular unit region U as in Embodiment 1. This extended part of the main part 1b is the rest after cutting the non-porous body part 1b at the grooves 2 and a section projecting from the ends of the porous surface part 1a.

Also in the present embodiment, at the cut surfaces produced by the cutting, the body part 1b of the valve-acting metal substrate 1 is exposed from the dielectric layer 3 as in Embodiment 1 (see FIG. 5(b)).

Next, as shown in FIG. 5(c), a dielectric layer 13 is formed on at least the cut surfaces located around the cathode layer formation parts A of the valve-acting metal substrates 1, among the cut surfaces. The dielectric layer 13 may be an oxide layer formed by immersing, in an electrolyte solution, at least the cathode layer formation parts A of the solid electrolytic capacitor elements 10 in the divided laminate chip 12 to apply anodization.

Next, as shown in FIG. 4, a laminate-type solid electrolytic capacitor 30 can be obtained in such a way that the anode lead parts B for each valve-acting metal substrate 1 are connected to an anode terminal 15, whereas the cathode extraction layers 7 are connected to a cathode terminal 17, and the laminate chip 12 is sealed with an insulating resin 19 such as an epoxy resin, with the anode terminal 15 and cathode terminal 17 (for example, lead frames) at least partially exposed.

Thus, the solid electrolytic capacitor 30 is manufactured as shown in FIG. 4 in accordance with one modification example of the first manufacturing method according to the present embodiment.

According to the present embodiment, the solid electrolyte layer 5 is not substantially formed on the bottoms of the grooves 2, the plurality of sheets 11 is stacked while having gaps in the section of the grooves 2 (see FIG. 5(a)), and the stacked sheets 11 can be cut with a lower load than in conventional manufacturing methods. In addition, according to the present embodiment, the laminate chips 12 composed of the solid electrolytic capacitor elements 10 stacked can be obtained at a time, thereby succeeding in efficiently manufacturing the laminate-type solid electrolytic capacitors 30 including the laminate chips 12.

Embodiment 3

The present embodiment relates to another modification example of the first method for manufacturing a solid electrolytic capacitor according to Embodiment 1 as described above. The manufacturing method according to the modification example, and a solid electrolytic capacitor element and a solid electrolytic capacitor manufactured by the method will be described below.

Figure 6:
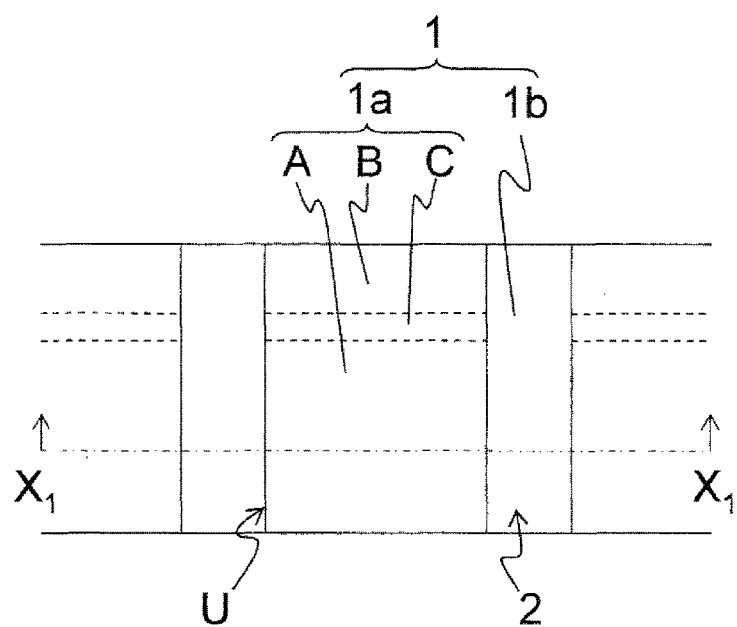
FIG. 6 shows diagrams for illustrating the first method for manufacturing a solid electrolytic capacitor according to Embodiment 3 as another modification example of Embodiment 1 of the present invention, where
Figure 6:
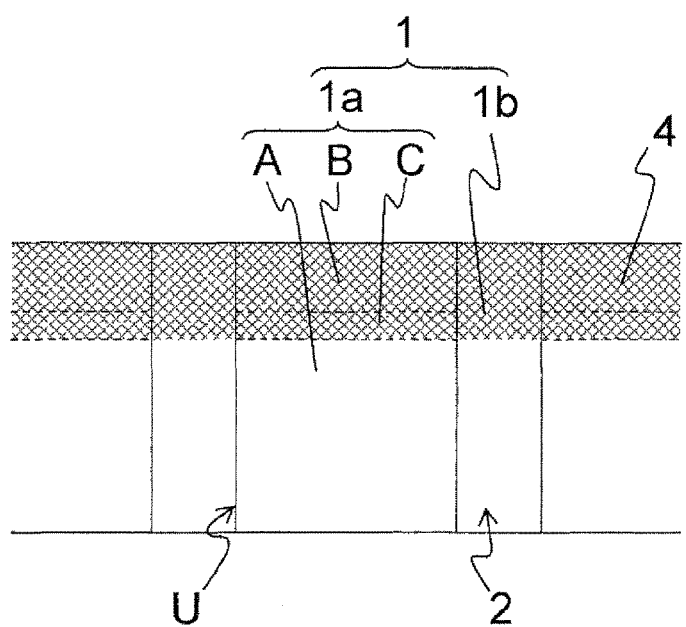

First, in the same way as described in Embodiment 1 with reference to FIGS. 1A(a) and 1A(b), grooves 2 are provided in both principal surfaces of a valve-acting metal substrate 1 including a porous surface part 1a and a non-porous body part 1b. While the grooves 2 are formed so as to partition the both principal surfaces of the valve-acting metal substrate 1 into a plurality of unit regions U as in Embodiment 1, the plurality of unit regions U lined up in a row is partitioned from each other by stripe-shaped grooves 2 as shown in FIG. 6(a) in the present embodiment.

Next, in the same way as described in Embodiment 1 with reference to FIG. 1A(c), a dielectric layer 3 is formed on the surfaces of the cathode layer formation part A in the porous surface part 1a of the valve-acting metal substrate 1, and the section of the grooves 2 located between adjacent cathode layer formation parts A. While the dielectric layer 3 can be formed as in Embodiment 1, an oxide layer formed by coating an anode lead part B and a spacing part C of the valve-acting metal substrate 1 as well as the section of the grooves 2 adjacent thereto, with a resist layer 4, and immersing the valve-acting metal substrate 1 in an electrolyte solution to apply anodization as shown in FIG. 6(b) in the present embodiment.

Next, in the same way as described in Embodiment 1 with reference to FIGS. 1A(d) and 1A(e), a solid electrolyte layer 5 and a cathode extraction layer 7 are sequentially formed on the surface of the dielectric layer 3 formed on the surface of the cathode layer formation part A in the porous surface part 1a of the valve-acting metal substrate 1. Thus, a sheet 11 is obtained for which a plurality of solid electrolytic capacitor elements 10 corresponding to the plurality of unit regions U is prepared integrally with the grooves 2 interposed therebetween (see FIG. 1A(e)).

Next, the sheet 11 obtained in the way described above is cut in the grooves 2 of the valve-acting metal substrate 1 in the same way as described in Embodiment 1 with reference to FIG. 1B(a).

Figure 7:
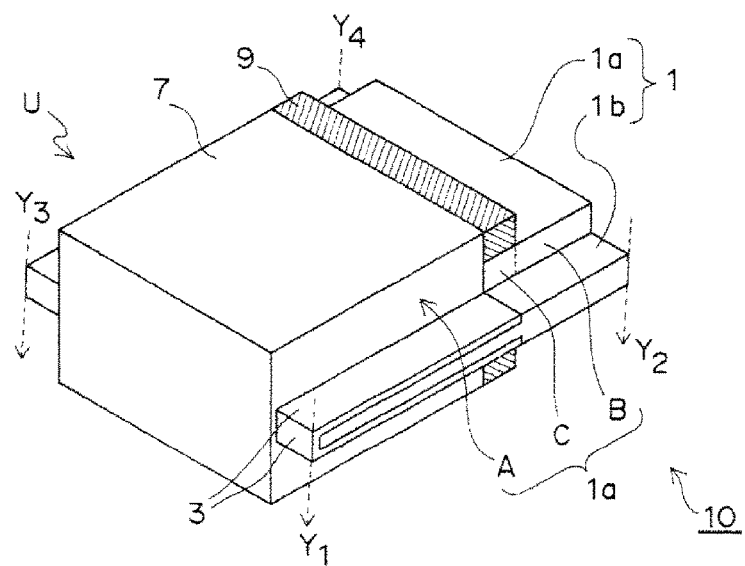
FIG. 7 shows diagrams for illustrating the first method for manufacturing a solid electrolytic capacitor according to Embodiment 3 of the present invention, where
Figure 7:
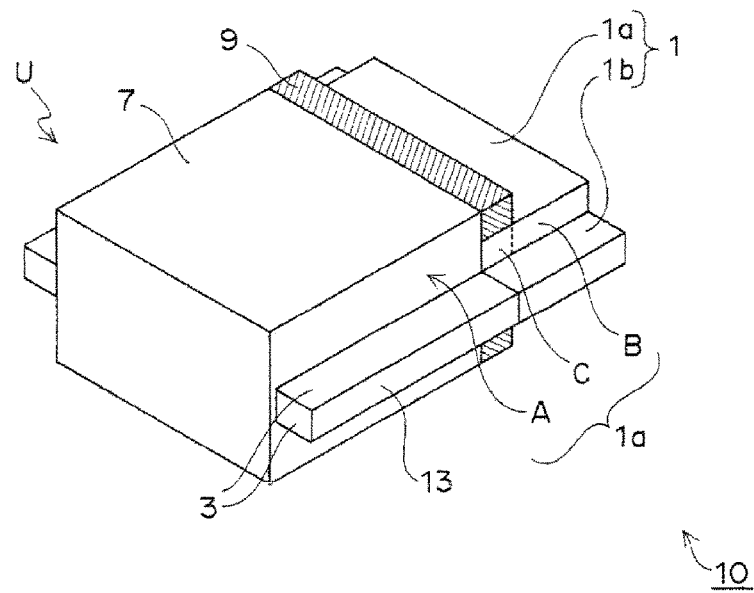

After the cutting, while the solid electrolytic capacitor elements 10 are individually divided as described in Embodiment 1 with reference to FIG. 1B(b), the valve-acting metal substrate 1 included in the divided solid electrolytic capacitor element 10 has an extended part (or convex part) of the non-porous body part 1b on only a pair of opposed sides of the rectangular unit region U as shown in FIG. 7(a) in the present embodiment.

Further, in the present embodiment, as shown in FIG. 7(a), the surface including lines $Y_1$ and $Y_2$ and the surface including lines $Y_3$ and $Y_4$ are regarded as cut surfaces, and at these two cut surfaces, the body part 1b of the valve-acting metal substrate 1 is exposed from the dielectric layer 3.

Then, a dielectric layer 13 is formed on the cut surfaces in the same way as described in Embodiment 1 with reference to FIG. 1B(c). This dielectric layer 13 may be, also in the present embodiment, as shown in FIG. 7(b), formed on at least the cut surfaces located around the cathode layer formation part A of the valve-acting metal substrate 1, among the cut surfaces.

Thus, the solid electrolytic capacitor element 10 is prepared as shown in FIG. 7(b) in accordance with another modification example of the first manufacturing method according to the present embodiment.

The solid electrolytic capacitor element 10 can be also included singly or plurally in a solid electrolytic capacitor.

Figure 8:
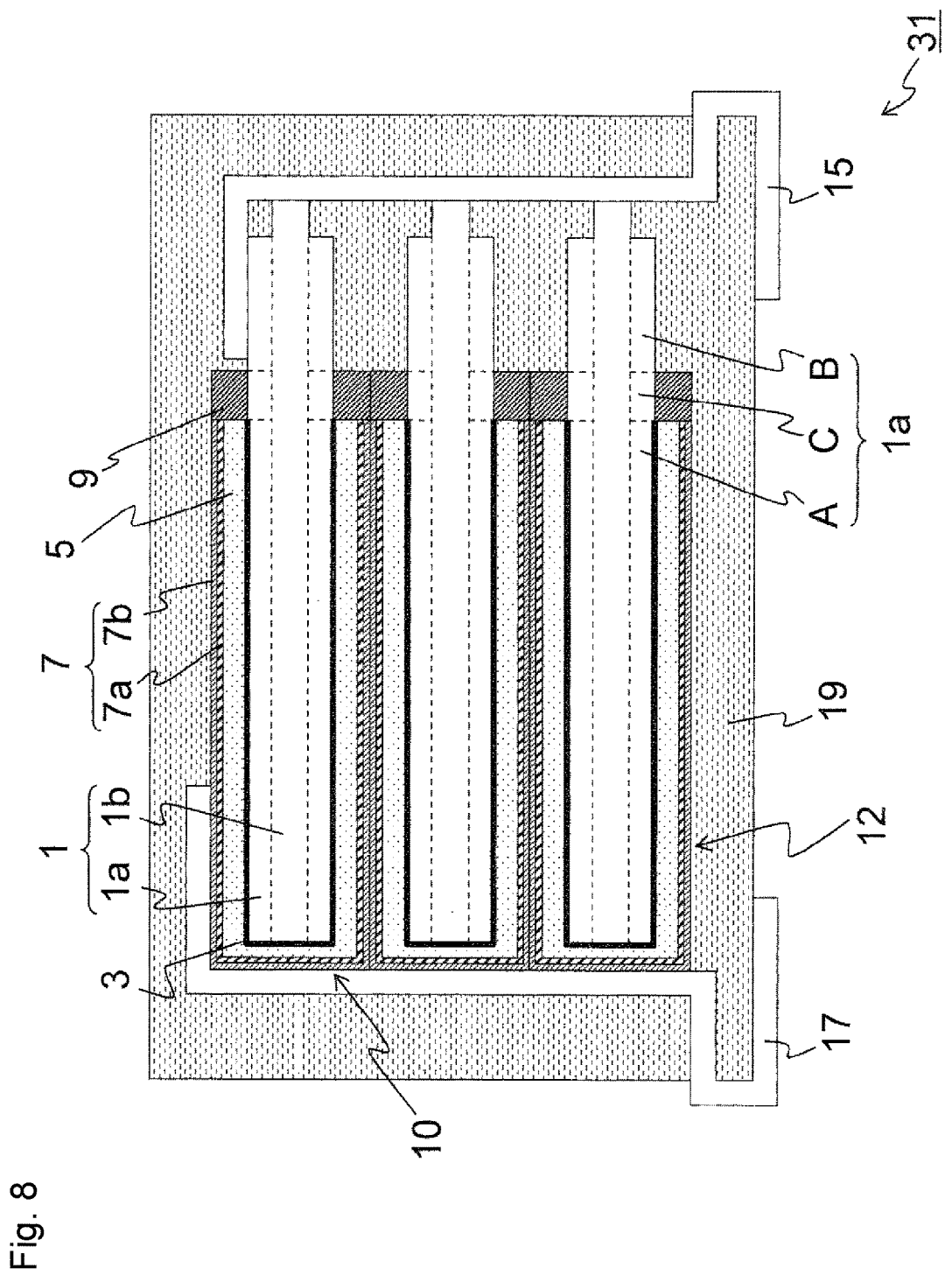
FIG. 8 is a schematic cross-sectional view illustrating a solid electrolytic capacitor manufactured by the first method for manufacturing a solid electrolytic capacitor according to Embodiment 3 of the present invention.

In the case of using the solid electrolytic capacitor element 10 plurally, a laminate-type solid electrolytic capacitor 31 can be obtained in such a way that, for example, as shown in FIG. 8, the solid electrolytic capacitor element 10 is stacked plurally to provide a laminate chip 12 (in the figure, a laminate chip 12 of solid electrolytic capacitor elements is shown which is composed of three solid electrolytic capacitor elements 10 by way of example), the anode lead parts B of the valve-acting metal substrates 1 are connected to an anode terminal 15, whereas the cathode extraction layers 7 are connected to a cathode terminal 17, and the laminate chip 12 is sealed with an insulating resin 19 such as an epoxy resin, with the anode terminal 15 and cathode terminal 17 (for example, lead frames) at least partially exposed.

The solid electrolytic capacitor element 10 according to the present embodiment has no extended part of the non-porous body part 1b at the cathode-side ends (the ends substantially parallel to the surface including the lines $Y_1$ and $Y_3$ as shown in FIG. 7(a)), and has the cathode-side ends entirely covered with the cathode extraction layers 7, and thus, as shown in FIG. 8, the cathode extraction layers 7 for each solid electrolytic capacitor element 10 can be easily connected to the cathode terminal 17.

Embodiment 4

The present embodiment relates to another modification example of the first method for manufacturing a solid electrolytic capacitor according to Embodiment 1 as described above. The manufacturing method according to the modification example, and a solid electrolytic capacitor element and a solid electrolytic capacitor manufactured by the method will be described below.

Figure 9A:
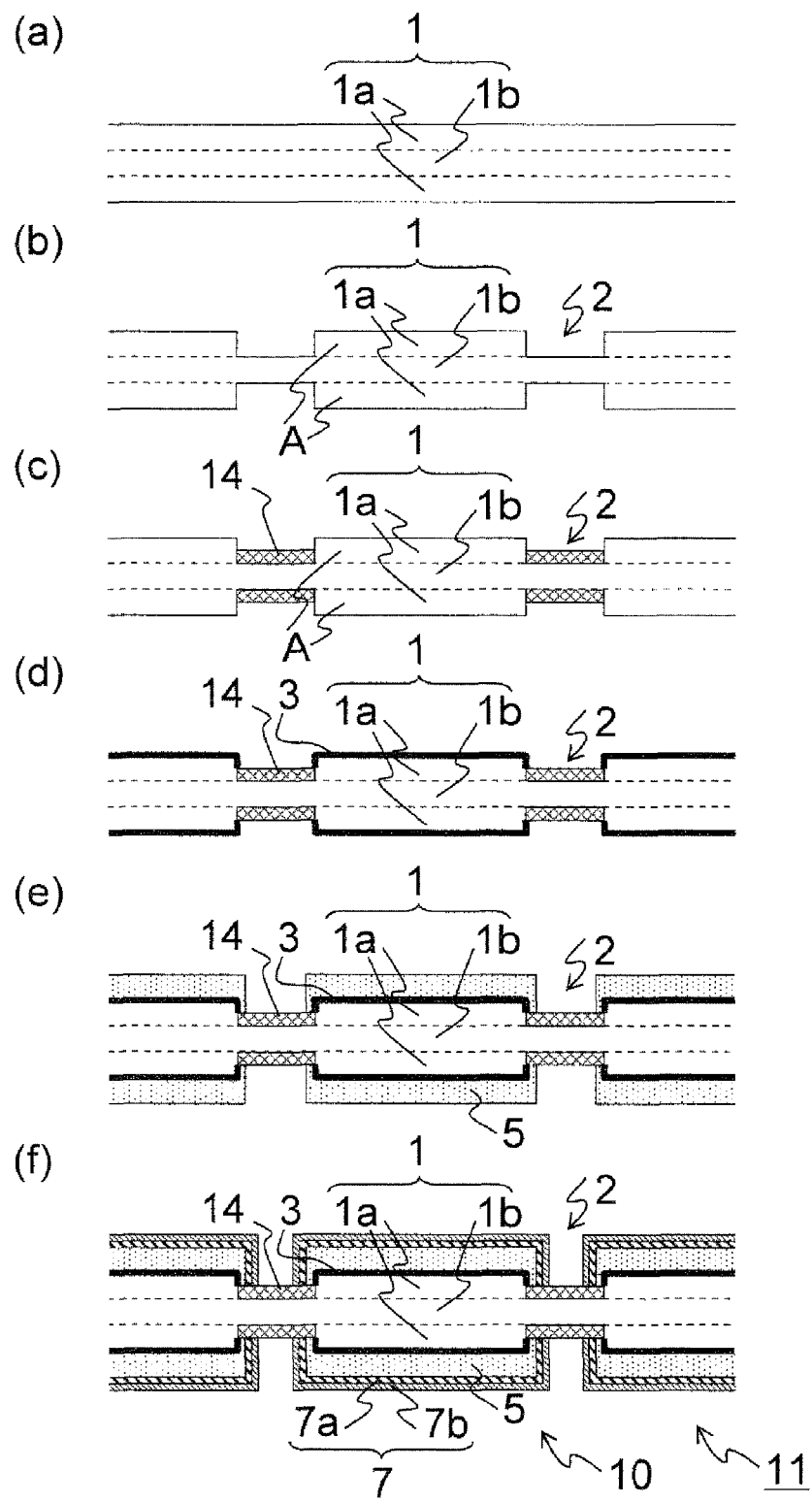
FIG. 9A shows schematic cross-sectional process diagrams for illustrating the first half of the first method for manufacturing a solid electrolytic capacitor according to Embodiment 4 as another modification example of Embodiment 1 of the present invention.

First, as shown in FIGS. 9A(a) and 9A(b), in the same way as described in Embodiment 1 with reference to FIGS. 1A(a) and 1A(b), grooves 2 are provided in both principal surfaces of a valve-acting metal substrate 1 including a porous surface part 1a and a non-porous body part 1b.

Next, as shown in FIG. 9A(c), a resist layer 14 is formed on the bottoms of the grooves 2. The resist layer 14 is typically composed of an insulating resin, and can be formed by, for example, screen printing. The resist layer 14 may be formed on, among the bottoms of the grooves 2, at least the section located between mutually adjacent cathode layer formation parts A, and preferably formed on the entire bottoms of the grooves 2. The height of the resist layer 14 can be set appropriately, as long as the height is not more than the depth of the groove 2 (that is, not projected from the groove 2).

Next, as shown in FIG. 9A(d), in the same way as described in Embodiment 1 with reference to FIG. 1A(c), a dielectric layer 3 is formed on the surface of the cathode layer formation part A in the porous surface part 1a of the valve-acting metal substrate 1. In the present embodiment, the dielectric layer is not formed on the surface of the resist layer 14, because there is the resist layer 14 on the bottoms of the grooves 2 (more specifically, at least the section of the grooves 2 located between mutually adjacent cathode layer formation parts A, the same hereinafter).

Next, as shown in FIGS. 9A(e) and 9A(f), in the same way as described in Embodiment 1 with reference to FIGS. 1A(d) and 1A(e), a solid electrolyte layer 5 and a cathode extraction layer 7 are sequentially formed on the surface of the dielectric layer 3 formed on the surface of the cathode layer formation part A in the porous surface part 1a of the valve-acting metal substrate 1.

In the present embodiment, the solid electrolyte layer 5 is, as shown in FIG. 9A(e), formed on the surface of the dielectric layer 3 formed on the cathode layer formation part A of the valve-acting metal substrate 1, but not substantially formed on the bottoms of the grooves 2. This is because, due to the fact that the bottoms of the grooves 2 are coated with the resist layer 14, the solution of the conductive polymer precursor is not able to permeate the bottoms of the grooves 2 owing to the resist layer 14 in the present embodiment. Under these circumstances, the solution of the conductive polymer precursor selectively permeates the porous cathode layer formation part A by capillary action. For this reason, the solid electrolyte layer 5 is not substantially formed on the surface of the region spaced from the cathode layer formation part A (at least the regions corresponding to the cut sections as described later), as for the surface of the resist layer 14.

Thus, a sheet 11 is obtained for which a plurality of solid electrolytic capacitor elements 10 corresponding to the plurality of unit regions U is prepared integrally with the grooves 2 interposed therebetween (see FIG. RAW).

Figure 9B:
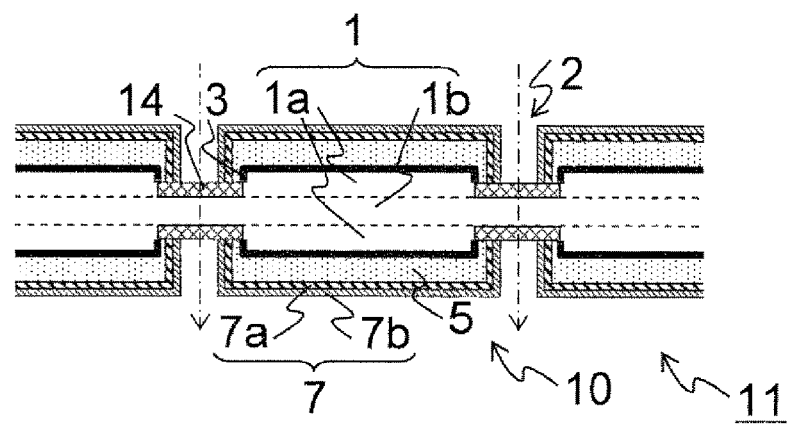
FIG. 9B shows schematic cross-sectional process diagrams for illustrating the second half of the first method for manufacturing a solid electrolytic capacitor according to Embodiment 4 of the present invention.
Figure 9B:
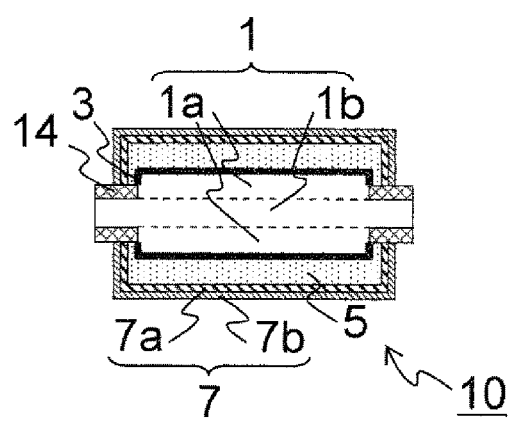
Figure 9B:
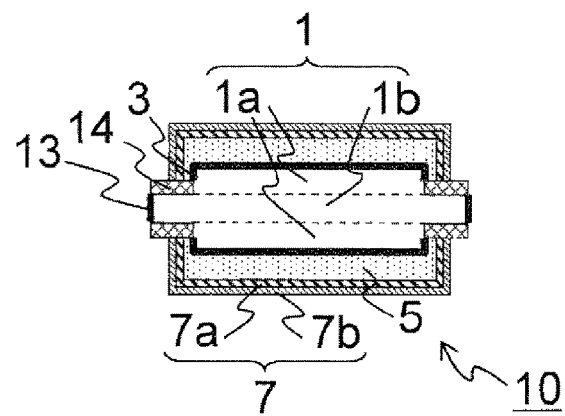

Next, the sheet 11 obtained in the way described above is cut in the grooves 2 of the valve-acting metal substrate 1 in the same way as described in Embodiment 1 with reference to FIG. 1B(a), as shown in FIG. 9B(a) (the cuts are schematically shown by arrows of dashed-dotted lines in the figure). The cut section of the groove 2 has the valve-acting metal substrate 1 and the resist layer 14, whereas the cut section has neither solid electrolyte layer 5 nor dielectric layer 3.

After the cutting, as shown in FIG. 9B(b), the solid electrolytic capacitor elements 10 are individually divided (one of the solid electrolytic capacitor elements 10 divided is shown in the figure).

The valve-acting metal substrate 1 included in the divided solid electrolytic capacitor element 10 has an extended part (or convex part) of the non-porous body part 1b on at least a pair of opposed sides. This extended part of the main part 1b is the rest after cutting the non-porous body part 1b at the grooves 2 and a section projecting from the ends of the porous surface part 1a.

Furthermore, the solid electrolytic capacitor element 10 according to the present embodiment has the resist layer 14 (see FIG. 9B(b)) coating the surfaces of the extended part of the non-porous body part 1b, which are substantially parallel to the principal surfaces. This resist layer 14 is the rest after cutting the resist layer 14 at the grooves 2.

Also in the present embodiment, at the cut surfaces produced by the cutting, the body part 1b of the valve-acting metal substrate 1 is exposed from the dielectric layer 3 (see FIG. 9B(b)).

Next, as shown in FIG. 9B(c), a dielectric layer 13 is formed on the cut surfaces in the same way as described in Embodiment 1 with reference to FIG. 1B(c). This dielectric layer 13 may be formed on at least the cut surfaces located around the cathode layer formation part A of the valve-acting metal substrate 1, among the cut surfaces.

The surface of the cathode layer formation part A of the valve-acting metal substrate 1 and the end surfaces of the extended part of the body part 1b in contact with the cathode layer formation part A (which are shown as surfaces substantially perpendicular to the principal surfaces in the example shown, the present embodiment is not limited to this example) are coated with the dielectric layers 3 and 13.

Thus, the solid electrolytic capacitor element 10 is prepared as shown in FIG. 9B(c) in accordance with another modification example of the first manufacturing method according to the present embodiment. The solid electrolytic capacitor element 10 includes:

the valve-acting metal substrate 1 which has the porous surface part 1a, the non-porous body part 1b, and the extended part of the non-porous body part 1b on at least a pair of opposed sides, and has the cathode layer formation part A in the porous surface part 1a;

the resist layer 14 for coating the surfaces of the extended part of the body part 1b of the valve-acting metal substrate 1, which are substantially parallel to the principal surfaces;

the dielectric layers 3 and 13 for coating the surface of the cathode layer formation part A of the valve-acting metal substrate 1, and the end surface of the extended part of the body part 1b in contact with the cathode layer formation part A; and the solid electrolytic layer 5 and the cathode extraction layer 7 sequentially formed on the surface of the dielectric layer 3 in the cathode layer formation part A of the valve-acting metal substrate 1.

In the solid electrolytic capacitor element 10, the extended part of the body part 1b of the valve-acting metal substrate 1 is derived from the grooves 2 provided in the both principal surfaces of the valve-acting metal substrate 1, the end surfaces of the extended part correspond to the cut surfaces produced by cutting the grooves 2, and the surfaces of the extended part substantially parallel to the principal surfaces correspond to the bottoms of the grooves 2. The extended part of the body part 1b may be identical to the non-porous body part 1b of the initially prepared valve-acting metal substrate 1 shown in FIG. 9A(a), or different therefrom depending on the method for forming the grooves 2. In the case of the solid electrolytic capacitor element 10, the end surfaces of the extended part of the body part 1b of the valve-acting metal substrate 1, in other words, the cut surfaces of the valve-acting metal substrate 1, which are likely to cause defects, are spaced from the solid electrolyte layer 5, and the surfaces of the extended part, which are substantially parallel to the principal surfaces, in other words, the bottoms of the grooves 2 are coated with the resist layer 14. The cut sections with the resist layer 14 formed and vicinity thereof have no charge accumulated, and the generation of leakage current in the cut sections and vicinity thereof can be thus further effectively suppressed.

Figure 10:
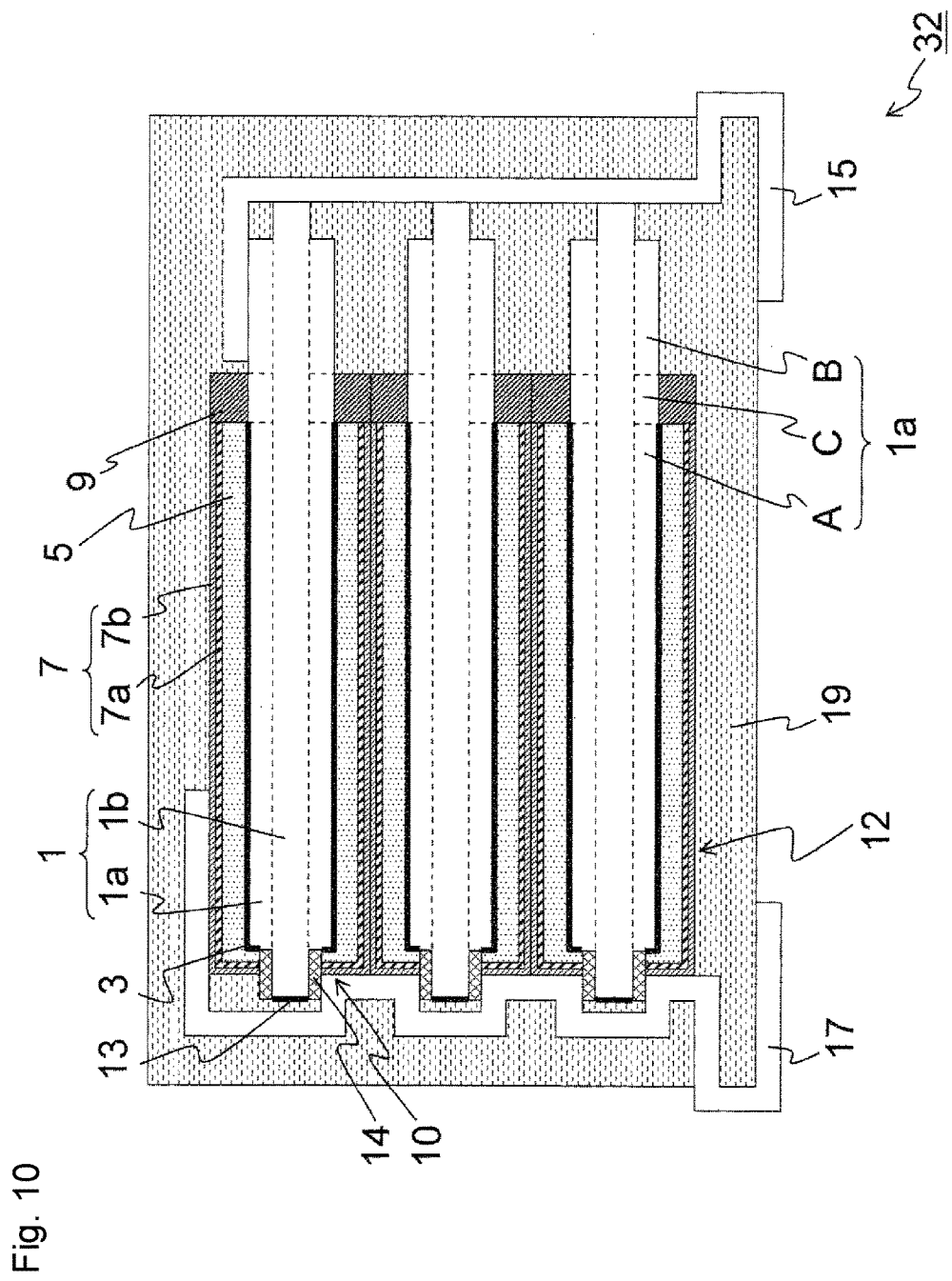
FIG. 10 is a schematic cross-sectional view illustrating a solid electrolytic capacitor manufactured by the first method for manufacturing a solid electrolytic capacitor according to Embodiment 4 of the present invention and Embodiment 5 as a modification example thereof.

The solid electrolytic capacitor element 10 can be included singly or plurally in a solid electrolytic capacitor. The solid electrolytic capacitor element 10 is used for solid electrolytic capacitors as in Embodiment 1. In the case of using the solid electrolytic capacitor element 10 plurally, for example, a laminate-type solid electrolytic capacitor 32 (in the figure, a laminate chip 12 of solid electrolytic capacitor elements is shown which is composed of three solid electrolytic capacitor elements 10 by way of example) as shown in FIG. 10 can be obtained.

Thus, a solid electrolytic capacitor including one, or two or more of the solid electrolytic capacitor elements is manufactured in accordance with another modification example of the first manufacturing method according to the present invention.

According to the present embodiment, the sheet 11 can be cut with a lower load than in conventional manufacturing methods because the bottoms of the grooves 2 have neither solid electrolyte 5 nor dielectric layer 3 formed, and moreover, the load for cutting in the grooves 2 is not applied to the dielectric layer 3, thereby succeeding in preventing defects from being generated in the dielectric layer 3, and thus making it possible to effectively reduce the leakage current. Furthermore, according to the present embodiment, commercially available valve-acting metal substrates with surfaces which have been already made porous can be used as the valve-acting metal substrate 1, and restrictions on the valve-acting metal substrate used are eased, as compared with conventional manufacturing methods.

Embodiment 5

The present embodiment relates to one modification example of the first method for manufacturing a solid electrolytic capacitor according to Embodiment 4 as described above. The manufacturing method according to the modification example, and a solid electrolytic capacitor manufactured by the method will be described below.

First, in the same way as described in Embodiment 4 with reference to FIGS. 9A(a) to 9A(f), a plurality of sheets 11 is prepared for which a plurality of solid electrolytic capacitor elements 10 corresponding to a plurality of unit regions U is prepared integrally with grooves 2 interposed therebetween.

Next, the plurality of sheets 11 obtained in the way described above is, as shown in FIG. 11(a), stacked so that the unit regions U of the respective sheets 11 are aligned in the thickness direction (while three sheets 11 are stacked by way of example in the figure, the embodiment is not limited to this example), and the plurality of sheets 11 stacked is cut in the grooves 2 of the valve-acting metal substrate 1 (the cuts are schematically shown by arrows of dashed-dotted lines in the figure). The cut section of the groove 2 has the valve-acting metal substrate 1 and the resist layer 14, whereas the cut section has no solid electrolyte layer 5.

Figure 11:
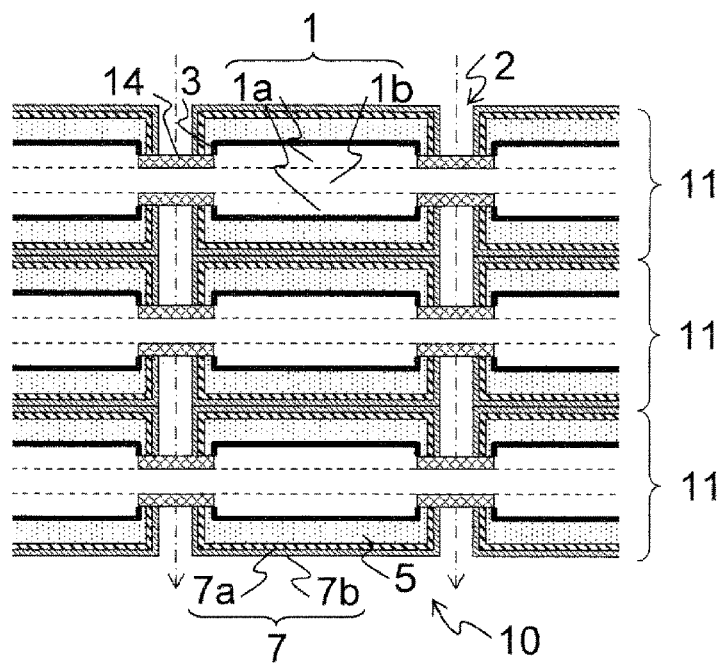
FIG. 11 shows diagrams for illustrating the first method for manufacturing a solid electrolytic capacitor according to Embodiment 5 of the present invention, which shows schematic cross-sectional process diagrams corresponding to FIG. 9B.
Figure 11:
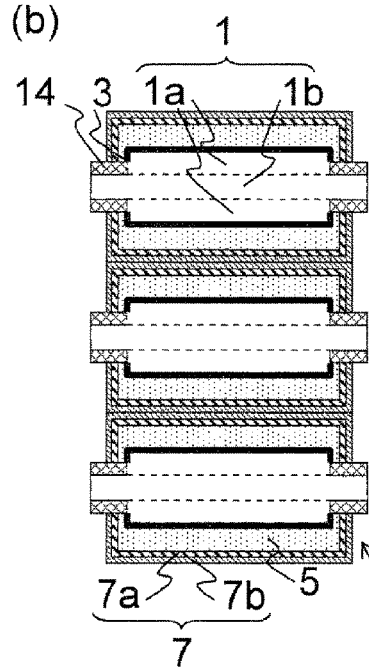
Figure 11:
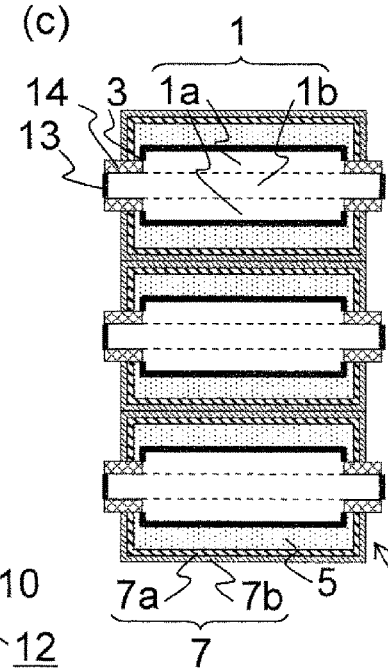

After the cutting, as shown in FIG. 11(b), the stacked solid electrolytic capacitor elements 10 are divided for each unit region U (from laminate chips 12 of solid electrolytic capacitor elements, which are composed of three solid electrolytic capacitor elements 10 by way of example, one divided laminate chip 12 is shown in the figure).

In the divided laminated chip 12, the valve-acting metal substrate 1 included in each solid electrolytic capacitor element 10 has an extended part (or convex part) of the non-porous body part 1b on at least a pair of opposed sides, in the present embodiment, on the sides located at the four peripheral sides of the rectangular unit region U as in Embodiment 1. This extended part of the main part 1b is the rest after cutting the non-porous body part 1b at the grooves 2 and a section projecting from the ends of the porous surface part 1a.

Also in the present embodiment, at the cut surfaces produced by the cutting, the body part 1b of the valve-acting metal substrate 1 is exposed from the dielectric layer 3 as in Embodiment 1 (see FIG. 11(b)).

Next, as shown in FIG. 11(c), a dielectric layer 13 is formed on at least the cut surfaces located around the cathode layer formation part A of the valve-acting metal substrate 1, among the cut surfaces. The dielectric layer 13 may be an oxide layer formed by immersing, in an electrolyte solution, at least the cathode layer formation parts A of the solid electrolytic capacitor elements 10 in the divided laminate chip 12 to apply anodization.

Next, as shown in FIG. 10, a laminate-type solid electrolytic capacitor 32 can be obtained in such a way that the anode lead parts B for each valve-acting metal substrate 1 are connected to an anode terminal 15, whereas the cathode extraction layers 7 are connected to a cathode terminal 17, and the laminate chip 12 is sealed with an insulating resin 19 such as an epoxy resin, with the anode terminal 15 and cathode terminal 17 (for example, lead frames) at least partially exposed.

Thus, the solid electrolytic capacitor 32 is manufactured as shown in FIG. 10 in accordance with the first manufacturing method according to the present embodiment.

According to the present embodiment, neither solid electrolyte layer 5 nor dielectric layer 3 is formed on the bottoms of the grooves 2, the plurality of sheets 11 would be stacked while having gaps in the section of the grooves 2 (see FIG. 11(a)), and the stacked sheets 11 can be cut with a lower load than in conventional manufacturing methods. In addition, according to the present embodiment, the laminate chips 12 composed of the solid electrolytic capacitor elements 10 stacked can be obtained at a time, thereby succeeding in efficiently manufacturing the laminate-type solid electrolytic capacitors 32 including the laminate chips 12.

Embodiment 6

The present embodiment relates to a second method for manufacturing a solid electrolytic capacitor according to an embodiment of the present invention. The manufacturing method and a solid electrolytic capacitor manufactured by the method will be described below.

First, in the same way as described in Embodiment 1 with reference to FIGS. 1A(a) to 1A(c), grooves 2 are provided in both principal surfaces of a valve-acting metal substrate 1 including a porous surface part 1a and a non-porous body part 1b, the bottoms of the grooves 2 are made non-porous, and a dielectric layer 3 is formed on the surfaces of a cathode layer formation part A in the porous surface part 1a of the valve-acting metal substrate 1, and the section of the grooves 2 located between mutually adjacent cathode layer formation parts A. A plurality of the valve-acting metal substrates 1 with the dielectric layer 3 formed is prepared.

Also in the present embodiment, the grooves 2 are formed so as to partition the both principal surfaces of the valve-acting metal substrate 1 into a plurality of unit regions U, and in regard to the valve-acting metal substrate 1, for each of the unit regions U, a cathode layer formation part A is defined in the porous surface part 1b, and an anode lead part B and a spacing part C can be further defined.

Figure 12A:
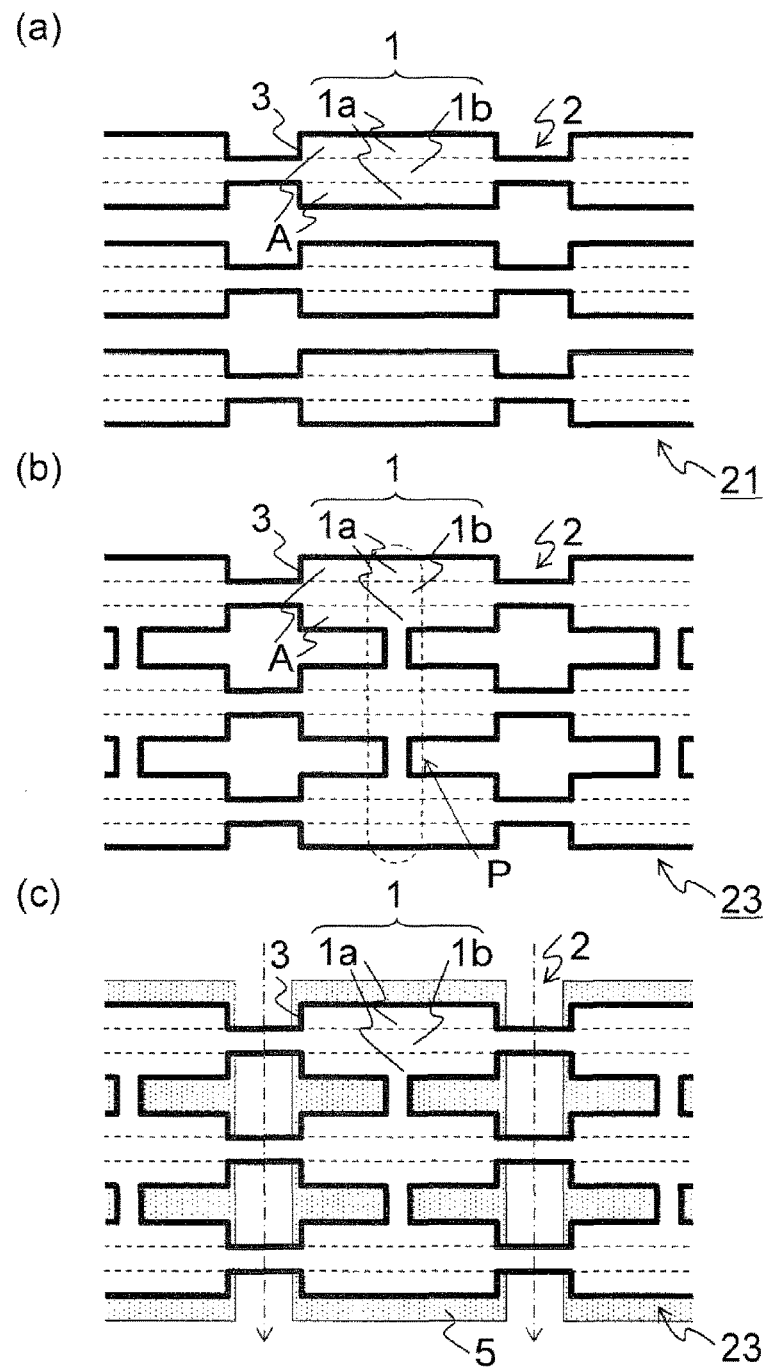
FIG. 12A shows schematic cross-sectional process diagrams for illustrating the first half of a second method for manufacturing a solid electrolytic capacitor according to Embodiment 6 of the present invention, where FIG. 12A(b) is a schematic cross-sectional process diagram of a valve-acting metal substrate virtually cut along the line $X_3$-$X_3$ of FIG. 13(a).

Next, the plurality of valve-acting metal substrate 1 with the dielectric layer 3 formed, which is obtained in the way described above, is stacked so that the unit regions U for each valve-acting metal substrate 1 are aligned in the thickness direction, thereby providing a laminate 21 as shown in FIG. 12A(a) (while three valve-acting metal substrates 1 each with the dielectric layer 3 formed are stacked by way of example in the figure, the embodiment is not limited to this example).

As shown in FIG. 12A(a), gaps are produced between the dielectric layers 3 of adjacent valve-acting metal substrates 1. The gaps may be sized such that a precursor solution (raw material solution) for a conductive polymer constituting a solid electrolyte 5 can penetrate in a subsequent step. The surface part 1a of the valve-acting metal substrate 1, which is porous, maintains the porous property even after the dielectric layer 3 is formed on the surface of the surface part 1a, and gaps are thus formed naturally between the dielectric layers 3 by merely stacking the plurality of valve-acting metal substrates 1 with the dielectric layer 3 formed.

In addition, before stacking the plurality of valve-acting metal substrates 1 with the dielectric layer 3 formed, an insulating part 9 is preferably formed so as to cover the spacing part C in the porous surface part 1a of the valve-acting metal substrate 1. The insulating part 9 is located between the valve-acting metal substrates 1, also thereby naturally forming gaps between the dielectric layers 3. Furthermore, in this case, the insulating part 9 can be used to fix (temporarily fix before forming joints in a subsequent step) the plurality of valve-acting metal substrates 1 to each other. More specifically, this insulating part 9 can mutually fix the plurality of valve-acting metal substrates 1 by separately applying an insulating resin to each of the valve-acting metal substrates 1, stacking these valve-acting metal substrates 1, and solidifying or curing the insulating resin by heating or the like to form the insulating part 9.

Figure 13:
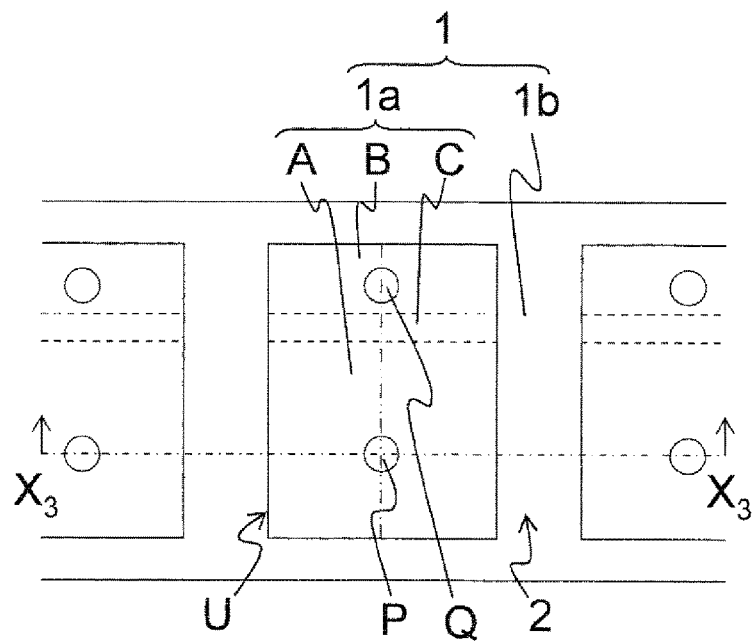
FIG. 13 shows diagrams for illustrating the second method for manufacturing a solid electrolytic capacitor according to Embodiment 6 of the present invention, where
Figure 13:
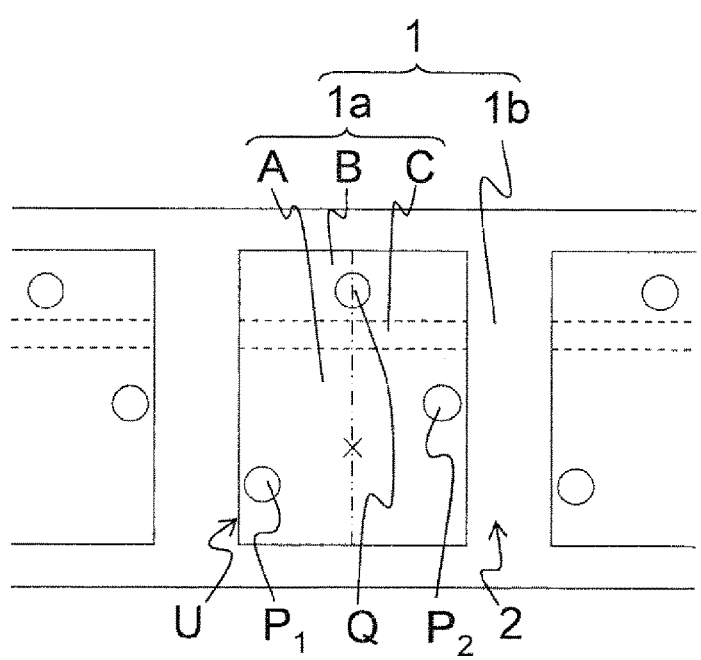

Next, as shown in FIGS. 12A(b) and 13(a), the valve-acting metal substrates 1 adjacent in the thickness direction in the laminate 21 are joined to each other at joints P and Q to obtain a joined laminate 23. It is to be noted that while FIG. 13 corresponds to the example shown in FIG. 2A in Embodiment 1 above described (the case where the plurality of unit regions U lined up in a row is partitioned from each other by the groove 2 surrounding the unit regions U), the same description applies to the example shown in FIG. 2B (the case where the plurality of unit regions U arranged in a matrix is partitioned from each other by the grid-like groove 2).

In the joined laminate 23, the valve-acting metal substrates 1 are electrically joined to each other with the joints P and Q interposed therebetween. In the example shown in the figure, one joint P is formed in the region of the cathode layer formation part A of the valve-acting metal substrate, whereas another joint Q is formed in the region of the anode lead part B of the valve-acting metal substrate 1. The positions and numbers of the joints P and Q are not particularly limited, and may be appropriately set depending on the requirements for the solid electrolytic capacitor manufactured, while there is preferably at least one joint in the cathode layer formation part A of the valve-acting metal substrate. The joints P and Q can have any appropriate cross-sectional shape such as circles, ellipses, rectangles, and squares.

More specifically, the joints P and Q are formed by applying any appropriate treatment to the laminate 21 to melt predetermined regions of the valve-acting metal substrates 1 (the porous surface parts 1 and the non-porous body parts 1b), thereby bringing the melted metals derived from adjacent valve-acting metal substrates 1 into direct contact with each other, and integrating the melted metals with surface tension or the like, and then solidifying the integrated melted metals. In these predetermined regions, the dielectric layer 3 may be opened in advance (more specifically, the valve-acting metal substrates 1 may be exposed), but the embodiment is not limited to this example.

The treatment for forming the joints is not particularly limited as long as the valve-acting metal substrates 1 can be melted, and may be, for example, heating, while the treatment is preferably carried out by welding that can electrically and mechanically join adjacent valve-acting metal substrates 1 to each other. The welding can be carried out by any single one of, for example, resistance welding, laser welding, and ultrasonic welding, or by using two or more thereof in combination.

In the present embodiment, the two joints P and Q are formed. In the case of forming two or more joints, the forming locations thereof can be arranged appropriately, while the valve-acting metal substrates 1 are preferably arranged so as to be joined with almost even force at the locations.

The joint Q is formed in the anode lead part B of the valve-acting metal substrate 1. In the case of forming the joint in the anode lead part B, it is preferable to form the joint Q on a line dividing the width of the anode lead part B in half (as indicated by a dashed-two dotted line in the figure) or in the vicinity thereof as shown in FIG. 13(a), because stress on the entire dielectric-coated valve-acting metal sheet can be equalized to prepare a solid electrolytic capacitor that is more stable electrically and mechanically. Specifically, the area of the joint Q is preferably 0.1% or more, more preferably 1% or more of the area of the anode lead part B, depending on the area ratio between the anode lead part B and the cathode layer formation part A. As long as the area of the joint Q is 0.1% or more of the area of the anode lead part B, necessary and sufficient mechanical joint strength and electrical conductivity (conduction) can be achieved. In the case of forming two or more joints in the anode lead part B, the area for each of the joints is preferably 0.1% or more, more preferably 1% or more of the area of the anode lead part B.

On the other hand, the joint P is formed in the cathode layer formation part A of the valve-acting metal substrate 1. In the case of forming the joint P in the cathode layer formation part A, the joint P may be formed, for example, as shown in FIG. 13(a), on a line dividing the width of the cathode layer formation part A in half (as indicated by a dashed-two dotted line in the figure) or in the vicinity thereof, and the arrangement of the joints is suitable in the case of forming joints by resistance welding. In the present embodiment, in such a way that the valve-acting metal substrates 1 are joined with almost even force at the multiple joints P and Q, the joint P is placed distally with respect to the anode lead part B from a central part in the length direction of the cathode layer formation part A as shown in FIG. 13(a). Alternatively, as a modification example of the present embodiment, a pair of joints $P_1$ and $P_2$ may be formed in substantially point-symmetric positions with respect to the center (indicated by a mark x in the figure) of the cathode layer formation part A, for example, as shown in FIG. 13(b), and the arrangement of the joints is suitable in the case of forming joints by laser welding. These arrangements are preferred, because the arrangements all enable to equalize the stress on the entire dielectric-coated valve-acting metal sheet, prepare a solid electrolytic capacitor that is more stable electrically and mechanically, and prevent the equivalent series resistance (ESR) from being increased. In the case of forming a joint in the cathode layer formation part A, the electrostatic capacitance corresponding to the joint will be lost as compared with a case of forming no joint in the part. In particular, as compared with a case where a joint is also roughen by etching to increase the effective area, the formation of the joint eliminates concavity and convexity (crushes the porous surface part 1a), thus resulting in loss of more electrostatic capacitance even with the same joint area. Therefore, the area of the joint is preferably reduced as much as possible, even while ensuring an electrical connection. Specifically, the area of the joint P is preferably 1% or more, more preferably 5% or more, and preferably 30% or less, more preferably 20% or less of the area of the cathode layer formation part A. As long as the area of the joint P is 1% or more of the area of the cathode layer formation part A, the adjacent valve-acting metal substrates 1 can be joined to each other in an electrical and mechanical stable fashion, and thus, separation of the joint can be avoided when a solid electrolyte layer as a cathode layer is formed in a subsequent step, while ensuring an electrical connection. On the other hand, as long as the area of the joint P is 30% or less of the area of the cathode layer formation part A, the electrostatic capacitance of the solid electrolytic capacitor will not be excessively lost, and it is thus not necessary to increase the number of stacked valve-acting metal substrates 1 in order to compensate for the loss of the electrostatic capacitance. In the case of forming two or more joints (for example, the joints $P_1$ and $P_2$ shown in FIG. 13(b)) in the cathode layer formation part A, the area for each of the joints is preferably 1% or more, more preferably 5% or more of the area of the cathode layer formation part A, and the total area of these joints is preferably 30% or less, more preferably 20% or less of the area of the cathode layer formation part A.

After the joining, when the surfaces of the joints in the valve-acting metal substrates 1 are coated with the dielectric layer 3, the joints in the valve-acting metal substrates 1 are thereby electrically insulated from a solid electrolyte layer 5 (which is formed in a subsequent step), while when the valve-acting metal substrates 1 are exposed at the surfaces of the joints, an operation is separately carried out for electrically insulating the joints from the solid electrolyte layer 5. For example, after the joining, the valve-acting metal substrates 1 may be exposed at both principal surfaces (that is, upper surface and lower surface) of the joined laminate 23 and in the gaps between the valve-acting metal substrates 1. In particular, in the cathode layer formation parts A of the valve-acting metal substrates 1, there is a possibility that the solid electrolytic capacitor will be short-circuited when the exposed valve-acting metal substrates 1 come into contact with the solid electrolyte layer 5, and it is thus preferable to coat the cathode layer formation parts A of the exposed valve-acting metal substrates 1 with a dielectric layer, and apply anodization to at least the cathode layer formation parts A after the formation of the joined laminate 23, so as to be insulated from the solid electrolyte layer 5. The conditions for the additional anodization can be the same conditions as for the anodization described above.

In the way described above, the joined laminate 23 where adjacent valve-acting metal substrates 1 in the laminate 21 are joined to each other is obtained from the laminate 21.

Next, as shown in FIG. 12A(c), the solid electrolyte layer 5 is formed as a continuous layer, so as to fill the gaps between the dielectric layers 3 formed on the surfaces of the cathode layer formation parts A of the adjacent valve-acting metal substrates 1 in the joined laminate 23, and coat the outer surface of the joined laminate 23 in the cathode layer formation parts A. The anode lead parts B of the valve-acting metal substrates 1 remain exposed without being filled or coated with the solid electrolyte layer 5. The solid electrolyte layer 5 can be formed in almost the same way as in Embodiment 1, depending on the arrangement of the unit regions U and grooves 2.

In this case, the solid electrolyte layer 5 is, as in Embodiment 1, as shown in FIG. 12A(c), formed on the surface of the dielectric layers 3 formed on the cathode layer formation parts A of the valve-acting metal substrates 1, but not substantially formed on regions of the grooves 2, which correspond to cut sections.

It is to be noted that although microscopically, there may, in some cases, be inevitably a portion of the gap incompletely filled with the solid electrolyte layer 5 between the dielectric coatings 3 formed on the surfaces of the cathode layer formation parts A of the valve-acting metal substrates 1, or an uncoated portion of the outer surface of the joined laminate 23, the solid electrolyte layer 5 has no trouble having such a portion as long as the solid electrolytic capacitor has allowable levels of electrical and mechanical characteristics.

Next, the joined laminate 23 with the solid electrolyte layer 5 formed is cut in the grooves 2 of the valve-acting metal substrates 1, as shown in FIG. 12A(c) (the cuts are schematically shown by arrows of dashed-dotted lines in the figure). The cut sections of the grooves 2 have, as in Embodiment 1, the valve-acting metal substrates 1 and the dielectric layers 3, whereas the cut sections have no solid electrolyte layer 5. The cutting can be carried out in the same way as in Embodiment 1.

Figure 12B:
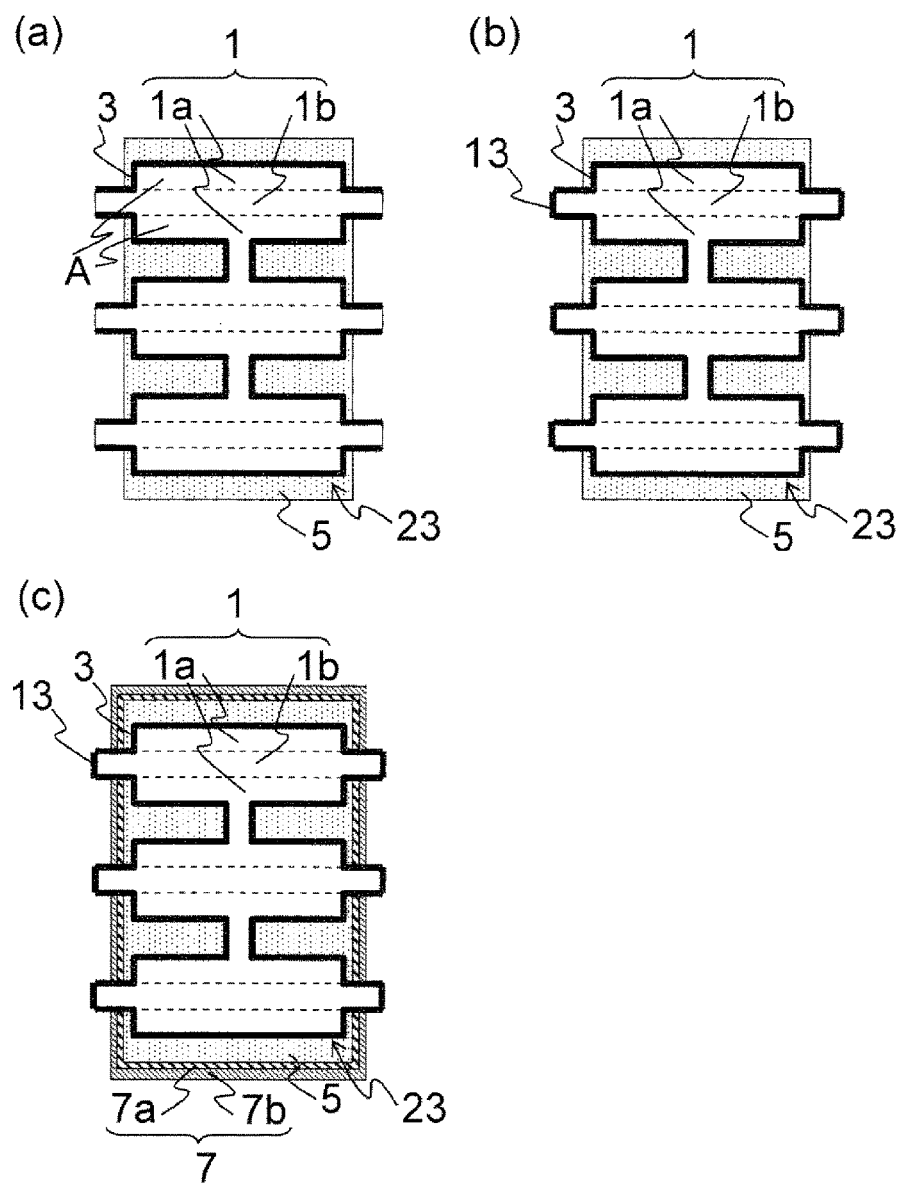
FIG. 12B shows schematic cross-sectional process diagrams for illustrating the second half of the second method for manufacturing a solid electrolytic capacitor according to Embodiment 6 of the present invention.

After the cutting, as shown in FIG. 12B(a), the joined laminate 23 with the solid electrolyte layer 5 formed is divided individually (one obtained by dividing the joined laminate 23 following the formation of the solid electrolyte layer 5 is shown in the figure).

In the joined laminate 23 divided after the formation of the solid electrolyte layer 5, each valve-acting metal substrate 1 has an extended part (or convex part) of the non-porous body part 1b on at least a pair of opposed sides, in the present embodiment, on the sides located at the four peripheral sides of the rectangular unit region U as in Embodiment 1. This extended part of the main part 1b is the rest after cutting the non-porous body part 1b at the grooves 2 and a section projecting from the ends of the porous surface part 1a.

Also in the present embodiment, at the cut surfaces produced by the cutting, the body parts 1b of the valve-acting metal substrates 1 are exposed from the dielectric layer 3 as in Embodiment 1 (see FIG. 12B(a)).

Next, as shown in FIG. 12B(b), a dielectric layer 13 is formed on at least the cut surfaces located around the cathode layer formation parts A of the valve-acting metal substrates 1, among the cut surfaces. The dielectric layer 13 may be an oxide layer formed by immersing at least the cathode layer formation parts A of the divided joined laminate 23 in an electrolyte solution to apply anodization.

Then, as shown in FIG. 12B(c), a cathode extraction layer 7 is formed on the surface of the solid electrolyte layer 5. The cathode extraction layer 7 can be formed by forming a carbon-containing layer 7a and a silver-containing layer 7b as in Embodiment 1.

Figure 14:
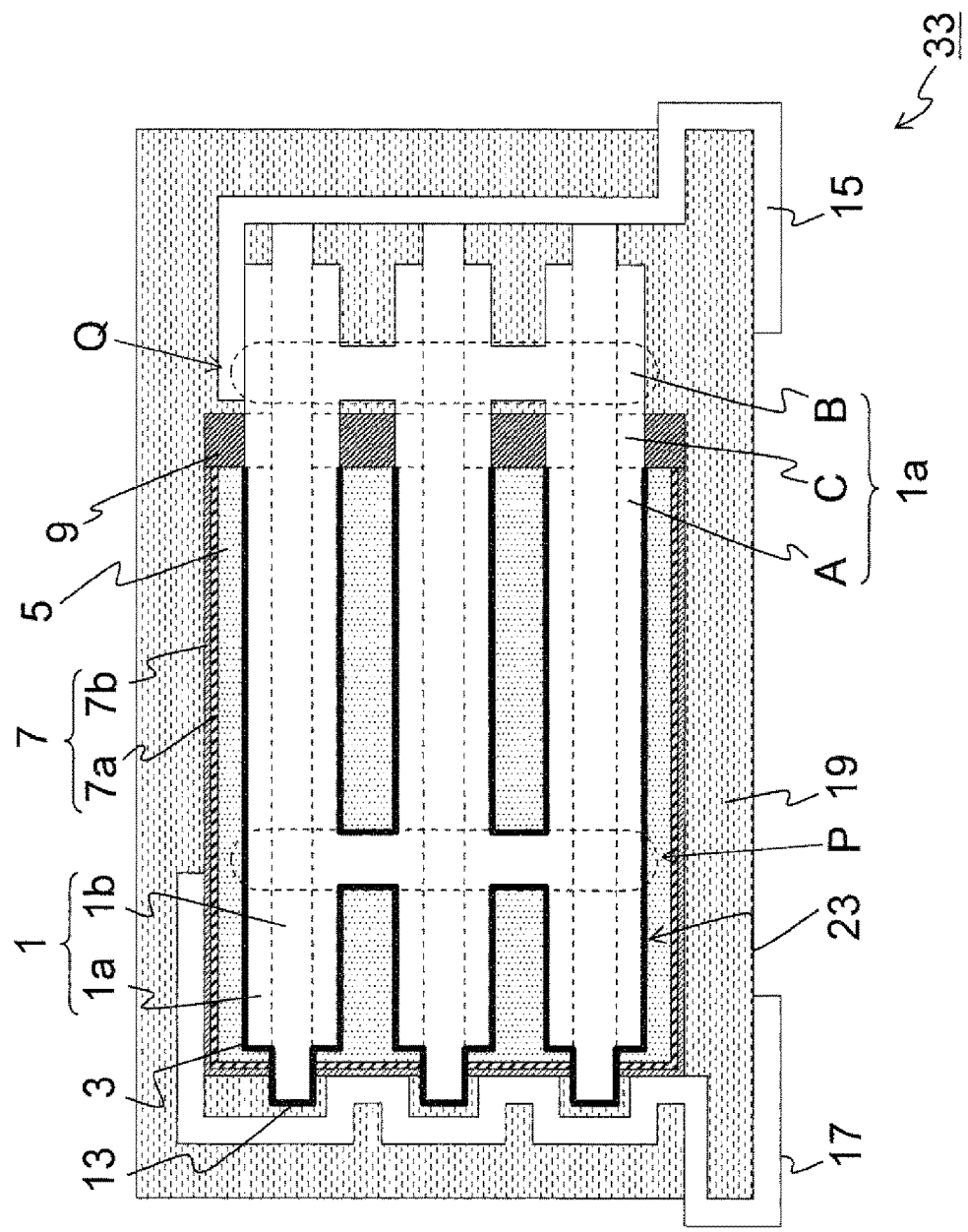
FIG. 14 is a schematic cross-sectional view illustrating a solid electrolytic capacitor manufactured by the second method for manufacturing a solid electrolytic capacitor according to Embodiment 6 of the present invention.

Next, as shown in FIG. 14, a laminate-type solid electrolytic capacitor 33 can be obtained in such a way that the anode lead part B of at least one valve-acting metal substrate 1 is connected to an anode terminal 15, whereas the cathode extraction layer 7 is connected to a cathode terminal 17, and the joined laminate 23 is sealed with an insulating resin 19 such as an epoxy resin, with the anode terminal 15 and cathode terminal 17 (for example, lead frames) at least partially exposed.

Thus, the solid electrolytic capacitor 33 is manufactured as shown in FIG. 14 in accordance with the second manufacturing method according to the present embodiment. The solid electrolytic capacitor 33 is a solid electrolytic capacitor including:

the joined laminate 23 obtained by stacking a plurality of valve-acting metal substrates 1 each including the cathode layer formation part A and joining the adjacent valve-acting metal substrates 1 to each other, where the valve-acting metal substrates A have surfaces coated with the dielectric layers 3 and 13 at least in the cathode layer formation parts A; and the continuous layer of the solid electrolyte layer 5 for filling the gaps between the dielectric layers 3 coating the valve-acting metal substrates 1 in the cathode layer formation parts A of the valve-acting metal substrates 1, and coating the outer surface of the joined laminate 23;

wherein each of the valve-acting metal substrates 1 has the porous surface part 1a, the non-porous body part 1b, and the extended part of the non-porous body part 1b on at least a pair of opposed sides, and has the cathode layer formation part A in the porous surface part 1b, the dielectric layers 3 and 13 coat the surface of the extended part of the body part 1b in contact with the cathode layer formation part A, in addition to the surface of the cathode layer formation part A of the valve-acting metal substrate.

According to the present embodiment, the joined laminate 23 can be filled and coated at a time with the solid electrolyte layer 5 as a continuous layer. The solid electrolytic capacitor 33 has no cathode extraction layer 7 in the gaps between the valve-acting metal substrates 1 constituting the joined laminate 23, thus making it possible to achieve a lower-profile capacitor.

Embodiment 7

The present embodiment relates to the second method for manufacturing a solid electrolytic capacitor according to another embodiment of the present invention. The manufacturing method, and a solid electrolytic capacitor manufactured by the method will be described below.

First, in the same way as described in Embodiment 4 with reference to FIGS. 9A(a) to 9A(d), grooves 2 are provided in both principal surfaces of a valve-acting metal substrate 1 including a porous surface part 1a and a non-porous body part 1b, the bottoms of the grooves 2 are made non-porous, a resist layer 14 is formed on the bottoms of the grooves 2 (more specifically, at least the section of the grooves 2 located between mutually adjacent cathode layer formation parts A, the same hereinafter), and a dielectric layer 3 is formed on the surface of a cathode layer formation part A in the porous surface part 1a of the valve-acting metal substrate 1. A plurality of the valve-acting metal substrates 1 with the resist layer 14 and dielectric layer 3 formed is prepared.

Also in the present embodiment, the grooves 2 are formed so as to partition the both principal surfaces of the valve-acting metal substrate 1 into a plurality of unit regions U, and in regard to the valve-acting metal substrate 1, for each of the unit regions U, a cathode layer formation part A is defined in the porous surface part 1b, and an anode lead part B and a spacing part C can be further defined.

Figure 15A:
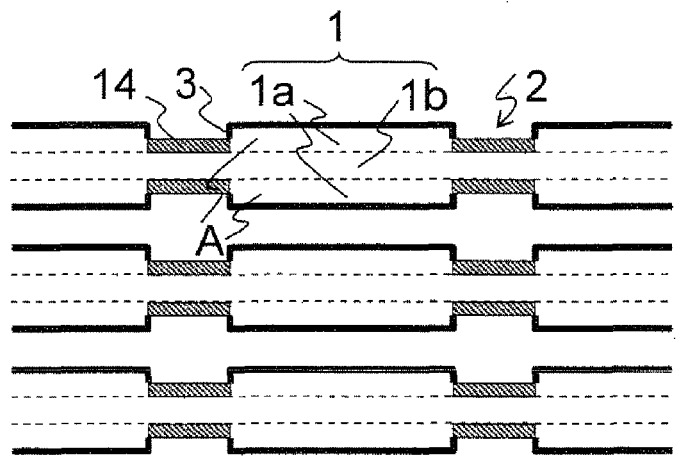
FIG. 15A shows schematic cross-sectional process diagrams for illustrating the first half of the second method for manufacturing a solid electrolytic capacitor according to Embodiment 7 of the present invention.
Figure 15A:
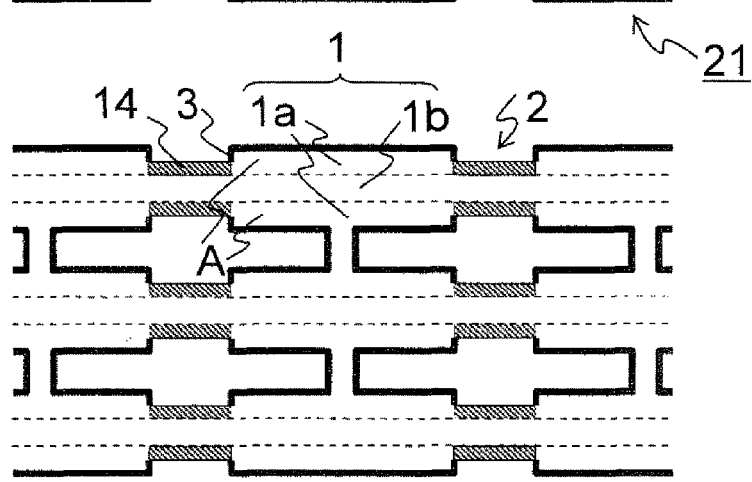
Figure 15A:
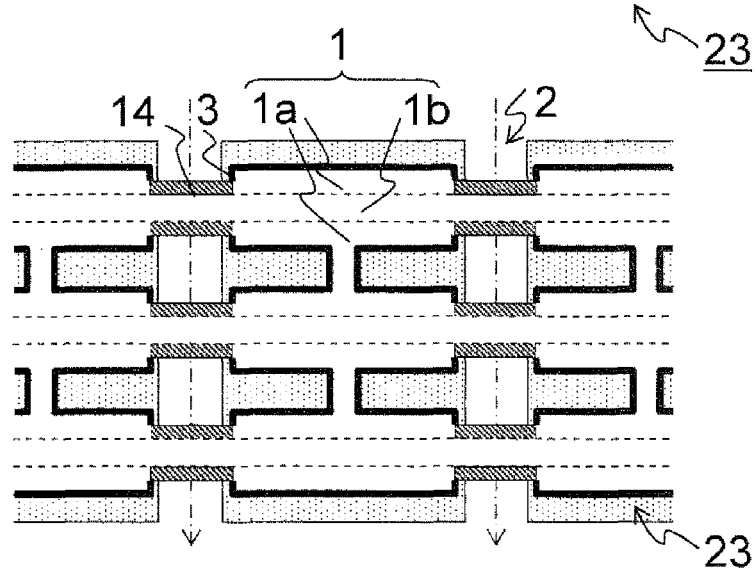

Next, the plurality of valve-acting metal substrates 1 with the resist layer 14 and dielectric layer 3 formed, which is obtained in the way described above, is stacked so that the unit regions U for each valve-acting metal substrate 1 are aligned in the thickness direction, thereby providing a laminate 21 in the same way as described in Embodiment 6 with reference to FIG. 12A(a), as shown in FIG. 15A(a) (while three valve-acting metal substrates 1 each with the dielectric layer 3 formed are stacked by way of example as shown in the figure, the embodiment is not limited to this example).

Next, as shown in FIG. 15A(b), in the same way as described in Embodiment 6 with reference to FIGS. 12A(a) and 13(a), the valve-acting metal substrates 1 adjacent in the thickness direction in the laminate 21 are joined to each other at joints P and Q to obtain a joined laminate 23.

Next, as shown in FIG. 15A(c), in the same way as described in Embodiment 6 with reference to FIG. 12A(c), the solid electrolyte layer 5 is formed as a continuous layer, so as to fill the gaps between the dielectric layers 3 formed on the surfaces of the cathode layer formation parts A of the adjacent valve-acting metal substrates 1 in the joined laminate 23, and coat the outer surface of the joined laminate 23 in the cathode layer formation parts A.

In this case, also in the present embodiment, the solid electrolyte layer 5 is, as in Embodiment 4, as shown in FIG. 15A(c), formed on the surfaces of the dielectric layers 3 formed on the cathode layer formation parts A of the valve-acting metal substrates 1, but not substantially formed on the bottoms of the grooves 2. In the present embodiment, due to the fact that the bottoms of the grooves 2 are coated with the resist layer 14, the solution of the conductive polymer precursor is not able to permeate the bottoms of the grooves 2. Under these circumstances, the solution of the conductive polymer precursor selectively permeates the porous cathode layer formation part A by capillary action. For this reason, the solid electrolyte layer 5 is not substantially formed on the surface of the region spaced from the cathode layer formation part A (at least, the regions corresponding to the cut sections as described later), as for the surface of the resist layer 14.

Next, the joined laminate 23 with the solid electrolyte layer 5 formed is cut in the grooves 2 of the valve-acting metal substrates 1 as shown in FIG. 15A(c) (the cuts are schematically shown by arrows of dashed-dotted lines in the figure). The cut sections of the grooves 2 have, as in Embodiment 4, the valve-acting metal substrates 1 and the dielectric layers 3, whereas the cut sections have no solid electrolyte layer 5. The cutting can be carried out in the same way as in Embodiment 4.

Figure 15B:
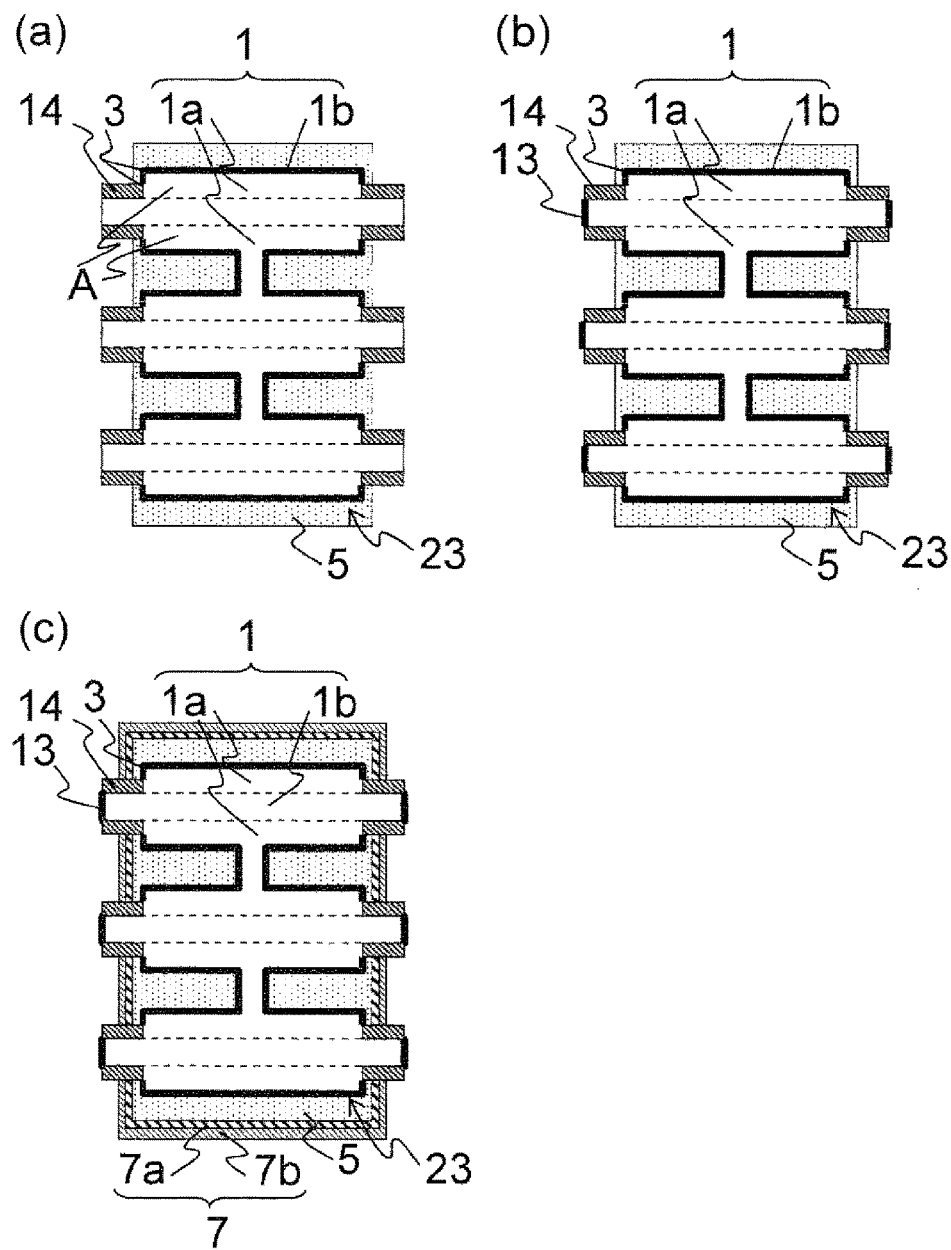
FIG. 15B shows schematic cross-sectional process diagrams for illustrating the second half of the second method for manufacturing a solid electrolytic capacitor according to Embodiment 7 of the present invention.

After the cutting, as shown in FIG. 15B(a), the joined laminate 23 with the solid electrolyte layer 5 formed is divided individually (one obtained by dividing the joined laminate 23 following the formation of the solid electrolyte layer 5 is shown in the figure).

In the joined laminate 23 divided after the formation of the solid electrolyte layer 5, each valve-acting metal substrate 1 has an extended part (or convex part) of the non-porous body part 1b on at least a pair of opposed sides, in the present embodiment, on the sides located at the four peripheral sides of the rectangular unit region U as in Embodiment 6. This extended part of the main part 1b is the rest after cutting the non-porous body part 1b at the grooves 2 and a section projecting from the ends of the porous surface part 1a.

Furthermore, the joined laminate 23 divided in accordance with the present embodiment has the resist layer (see FIG. 15B(a)) coating the surfaces of the extended parts of the non-porous body parts 1b, which are substantially parallel to the principal surfaces. This resist layer 14 is the rest after cutting the resist layer 14 at the grooves 2.

Also in the present embodiment, at the cut surfaces produced by the cutting, the body parts 1b of the valve-acting metal substrates 1 are exposed from the dielectric layer 3 (see FIG. 15B(a)).

Next, as shown in FIG. 15B(b), a dielectric layer 13 is formed on the cut surfaces in the same way as described in Embodiment 6 with reference to FIG. 12B(b). This dielectric layer 13 may be formed on at least the cut surfaces located around the cathode layer formation part A of the valve-acting metal substrate 1, among the cut surfaces.

The surface of the cathode layer formation part A of the valve-acting metal substrate 1 and the end surfaces of the extended part of the body part 1b in contact with the cathode layer formation part A (which are shown as surfaces substantially perpendicular to the principal surfaces in the example shown, the present embodiment is not limited to this example) are coated with the dielectric layers 3 and 13.

Then, as shown in FIG. 15B(c), a cathode extraction layer 7 is formed on the surface of the solid electrolyte layer 5 in the same way as described in Embodiment 6 with reference to FIG. 12B(c). The cathode extraction layer 7 can be formed by forming a carbon-containing layer 7a and a silver-containing layer 7b as in Embodiment 1.

Figure 16:
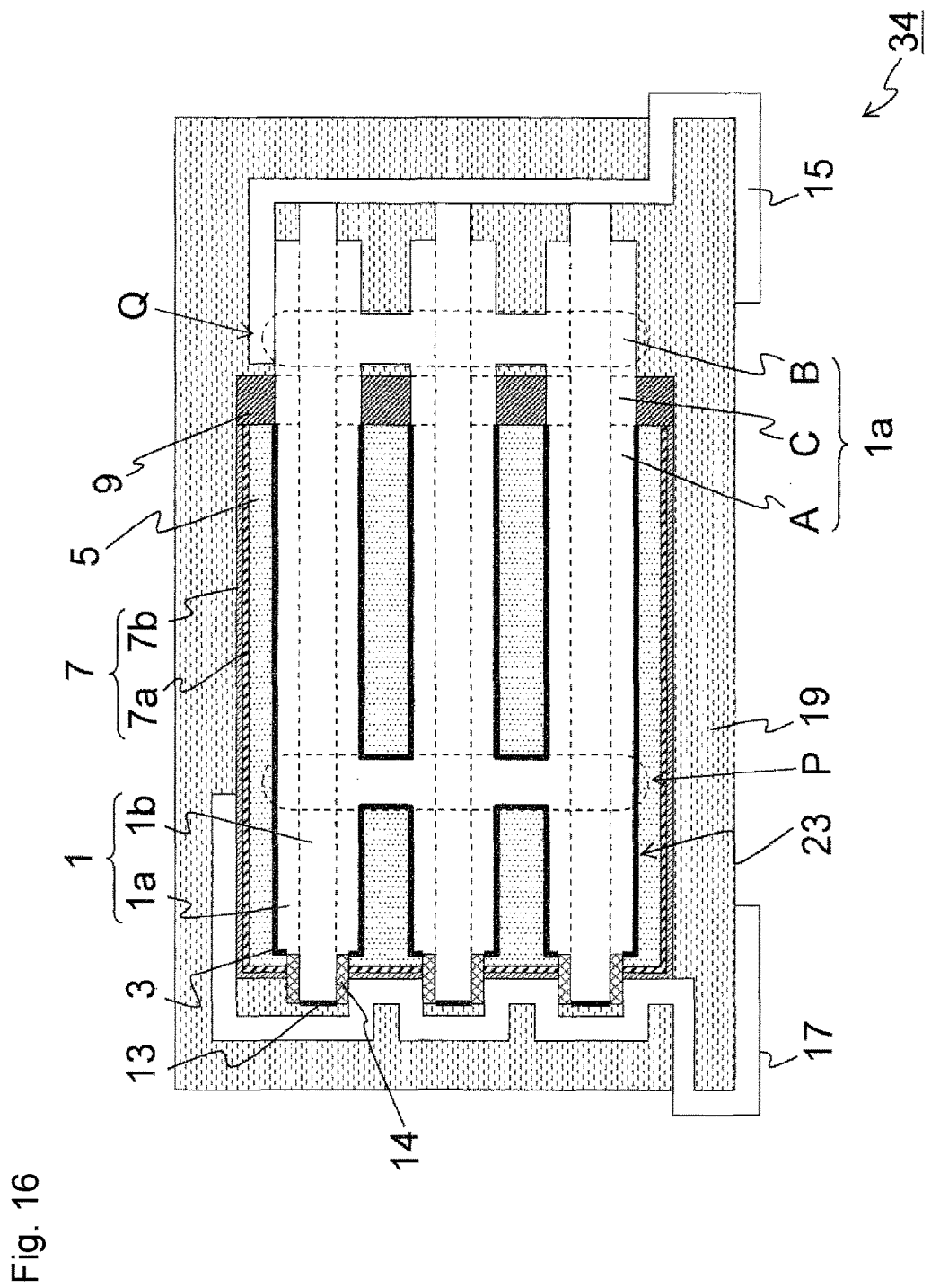
FIG. 16 is a schematic cross-sectional view illustrating a solid electrolytic capacitor manufactured by the second method for manufacturing a solid electrolytic capacitor according to Embodiment 7 of the present invention.

Next, as shown in FIG. 16, a laminate-type solid electrolytic capacitor 34 can be obtained in such a way that the anode lead part B of at least one valve-acting metal substrate 1 is connected to an anode terminal 15, whereas the cathode extraction layer 7 is connected to a cathode terminal 17, and the joined laminate 23 is sealed with an insulating resin 19 such as an epoxy resin, with the anode terminal 15 and cathode terminal 17 (for example, lead frames) at least partially exposed.

Thus, the solid electrolytic capacitor 34 is manufactured as shown in FIG. 16 in accordance with the second manufacturing method according to the present embodiment. The solid electrolytic capacitor 34 is a solid electrolytic capacitor including:

the joined laminate 23 obtained by stacking a plurality of valve-acting metal substrates 1 each including the cathode layer formation part A and joining the adjacent valve-acting metal substrates 1 to each other, where the valve-acting metal substrates 1 have surfaces coated with the dielectric layers 3 and 13 at least in the cathode layer formation parts A; and the continuous layer of the solid electrolyte layer 5 for filling the gaps between the dielectric layers 3 coating the valve-acting metal substrates 1 in the cathode layer formation parts A of the valve-acting metal substrates 1, and coating the outer surface of the joined laminate 23, wherein each of the valve-acting metal substrates 1 has the porous surface part 1a, the non-porous body part 1b, and the extended part of the non-porous body part 1b on at least a pair of opposed sides, and has the cathode layer formation part A in the porous surface part 1a, the surfaces of the extended part of the body part 1b of the valve-acting metal substrate 1, which are substantially parallel to the principal surfaces, are coated with the resist layer 14, and the dielectric layers 3 and 13 coat the end surface of the extended part of the body part 1b in contact with the cathode layer formation part A, in addition to the surface of the cathode layer formation part A of the valve-acting metal substrate 1.

In the solid electrolytic capacitor 34, the extended parts of the body parts 1b of the valve-acting metal substrates 1 are derived from the grooves 2 provided in the both principal surfaces of the valve-acting metal substrates 1, the end surfaces of the extended parts correspond to the cut surfaces produced by cutting the grooves 2, and the surfaces of the extended parts substantially parallel to the principal surfaces correspond to the bottoms of the grooves 2. The extended part of the body part 1b may be identical to the non-porous body part 1b of the initially prepared valve-acting metal substrate 1 shown in FIG. 9A(a), or different therefrom depending on the method for forming the grooves 2. In the case of the solid electrolytic capacitor 34, the end surfaces of the extended parts of the body parts 1b of the valve-acting metal substrates 1, in other words, the cut surfaces of the valve-acting metal substrates 1, which are likely to cause defects, are spaced from the solid electrolyte layer 5, and the surfaces of the extended parts, which are substantially parallel to the principal surfaces, in other words, the bottoms of the grooves 2 are coated with the resist layer 14. Thus, the cut sections with the resist layer 14 formed and vicinity thereof have no charge accumulated, and the generation of leakage current in the cut sections and vicinity thereof can be thus further effectively suppressed. Additionally, according to the present embodiment, the joined laminate 23 can be filled and coated at a time with the solid electrolyte layer 5 as a continuous layer. The solid electrolytic capacitor 34 has no cathode extraction layer 7 in the gaps between the valve-acting metal substrates 1 constituting the joined laminate 23, thus making it possible to achieve a lower-profile capacitor.

While Embodiments 1 to 7 of the present invention have been described above, various modifications can be made to these embodiments. For example, the same modification as Embodiment 2 to Embodiment 1 can be also made to Embodiment 3. In addition, for example, the same modification as Embodiment 3 to Embodiment 1 can be also made to Embodiments 4 to 7.

The present invention can be used, but not limited to, for manufacturing laminate-type solid electrolytic capacitors.

DESCRIPTION OF REFERENCE SYMBOLS 1 valve-acting metal substrate
1a porous surface part
1b non-porous body part
2 groove
3 dielectric layer
4 resist layer
5 solid electrolyte layer
7 cathode extraction layer
7a carbon-containing layer
7b silver-containing layer
9 insulating part
10 solid electrolytic capacitor element
11 sheet
12 laminate chip (of solid electrolytic capacitor elements)
13 dielectric layer
14 resist layer
15 anode terminal
17 cathode terminal
19 insulating resin
21 laminate (of valve-acting metal substrates with dielectric layer formed)

23 joined laminate (of valve-acting metal substrates with dielectric layer formed)
30, 31, 32, 33, 34 solid electrolytic capacitor
A cathode layer formation part
B anode lead part
C spacing part
U unit region
P, $P_1$, $P_2$, Q joint

The invention claimed is:

1. A solid electrolytic capacitor comprising:
a joined laminate comprising a stacked plurality of valve-acting metal substrates that each include a cathode layer formation part, the joined laminate having adjacent valve-acting metal substrates joined to each other, wherein each of the valve-acting metal substrates includes a porous surface part, a non-porous body part, and an extended part of the non-porous body part on at least a pair of opposed sides thereof, the cathode layer formation part being included in the porous surface part;
a dielectric layer covering surfaces of the valve-acting metal substrates at least in the cathode layer formation parts, and covering at least one surface of the extended part of the non-porous body part; and
a continuous layer of a solid electrolyte layer that fills gaps between the dielectric layers and covers an outer surface of the joined laminate.

2. The solid electrolytic capacitor according to claim 1, wherein the at least one surface of the extended part of the non-porous body part are opposed surfaces that are substantially parallel to principal surfaces of the valve-acting metal substrates.

3. A solid electrolytic capacitor comprising:
a joined laminate comprising a stacked plurality of valve-acting metal substrates that each include a cathode layer formation part, the joined laminate having adjacent valve-acting metal substrates joined to each other, wherein each of the valve-acting metal substrates includes a porous surface part, a non-porous body part, and an extended part of the non-porous body part on at least a pair of opposed sides thereof, the cathode layer formation part being included in the porous surface part;
a dielectric layer covering surfaces of the valve-acting metal substrates at least in the cathode layer formation parts, and covering at least one end surface of the extended part of the non-porous body part;
a continuous layer of a solid electrolyte layer that fills gaps between the dielectric layers and covers an outer surface of the joined laminate; and
a resist layer covering the at least one surface of the extended part of the non-porous body part of the valve-acting metal substrates, the at least one surface being opposed surfaces that are substantially parallel to principal surfaces of the valve-acting metal substrates.

4. The solid electrolytic capacitor according to claim 3, wherein the at least one surface of the extended part of the non-porous body part are opposed end surfaces of the extended part.

* * * * *